United States Patent
Yoo et al.

(10) Patent No.: US 9,965,028 B2
(45) Date of Patent: May 8, 2018

(54) METHOD FOR SUSPENSION SENSING IN INTERACTIVE DISPLAY, METHOD FOR PROCESSING SUSPENSION SENSING IMAGE, AND PROXIMITY SENSING APPARATUS

(75) Inventors: Byung In Yoo, Seoul (KR); Du Sik Park, Suwon-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1157 days.

(21) Appl. No.: 13/081,126

(22) Filed: Apr. 6, 2011

(65) Prior Publication Data
US 2011/0248918 A1    Oct. 13, 2011

(30) Foreign Application Priority Data
Apr. 7, 2010 (KR) .......................... 10-2010-0031798

(51) Int. Cl.
G06F 3/01 (2006.01)
G06F 3/0481 (2013.01)

(52) U.S. Cl.
CPC .............. G06F 3/011 (2013.01); G06F 3/017 (2013.01); G06F 3/04815 (2013.01)

(58) Field of Classification Search
None
See application file for complete search history.

(56) References Cited

U.S. PATENT DOCUMENTS

| | | |
|---|---|---|
| 5,454,043 A | 9/1995 | Freeman |
| 2004/0193413 A1* | 9/2004 | Wilson et al. ................ 704/243 |
| 2006/0010400 A1* | 1/2006 | Dehlin .................. G06F 3/0354 715/856 |
| 2008/0181459 A1 | 7/2008 | Martin et al. |
| 2008/0199165 A1* | 8/2008 | Ng ......................... G03B 17/00 396/51 |
| 2008/0240507 A1 | 10/2008 | Niwa et al. |

(Continued)

FOREIGN PATENT DOCUMENTS

| | | |
|---|---|---|
| JP | 2005-301693 | 10/2005 |
| JP | 2006-209563 | 8/2006 |

(Continued)

OTHER PUBLICATIONS

Otmar Hilliges, Shahram Izadi, Andrew Wilson, Steve Hodges, Armando Garcia-Mendoza, Andreas Butz, Interactions in the Air: Adding Further Depth to Interactive Tabletops. ACM UIST, 2009. (pp. 139-148).

(Continued)

*Primary Examiner* — Stephen Sherman
*Assistant Examiner* — Andre Matthews
(74) *Attorney, Agent, or Firm* — NSIP Law

(57) ABSTRACT

Provided is a method for proximity sensing in an interactive display and a method of processing a proximity sensing image. The method for proximity-sensing may include suspending, in a three-dimensional (3D) space, at least one hand of a user to manipulate at least one of a viewpoint of the user and a position of a virtual object displayed on a screen, and changing the virtual object by manipulating at least one of the position of the virtual object and the viewpoint of the user based on the suspending.

11 Claims, 28 Drawing Sheets

(56) References Cited

U.S. PATENT DOCUMENTS

| | | | |
|---|---|---|---|
| 2009/0085877 A1* | 4/2009 | Chang | G06F 3/0488 345/173 |
| 2009/0135135 A1 | 5/2009 | Tsurumi | |
| 2011/0141009 A1* | 6/2011 | Izumi | 345/156 |
| 2011/0197161 A1* | 8/2011 | Mattingly et al. | 715/810 |

FOREIGN PATENT DOCUMENTS

| | | |
|---|---|---|
| JP | 2008-123061 A | 5/2008 |
| JP | 2009-070245 | 4/2009 |
| JP | 4318056 B1 * | 8/2009 |
| KR | 10-2007-0024969 | 3/2007 |
| KR | 10-2007-0121413 | 12/2007 |
| KR | 10-2008-0041049 | 5/2008 |
| KR | 10-2009-0035672 | 4/2009 |
| KR | 10-2009-0038413 | 4/2009 |
| KR | 10-2009-0056760 A | 6/2009 |

OTHER PUBLICATIONS

Korean Office Action dated Aug. 24, 2016, in counterpart Korean Application No. 10-2010-0031798 (5 pages in English, 6 pages in Korean).

* cited by examiner

Left  Right  Top  Bottom

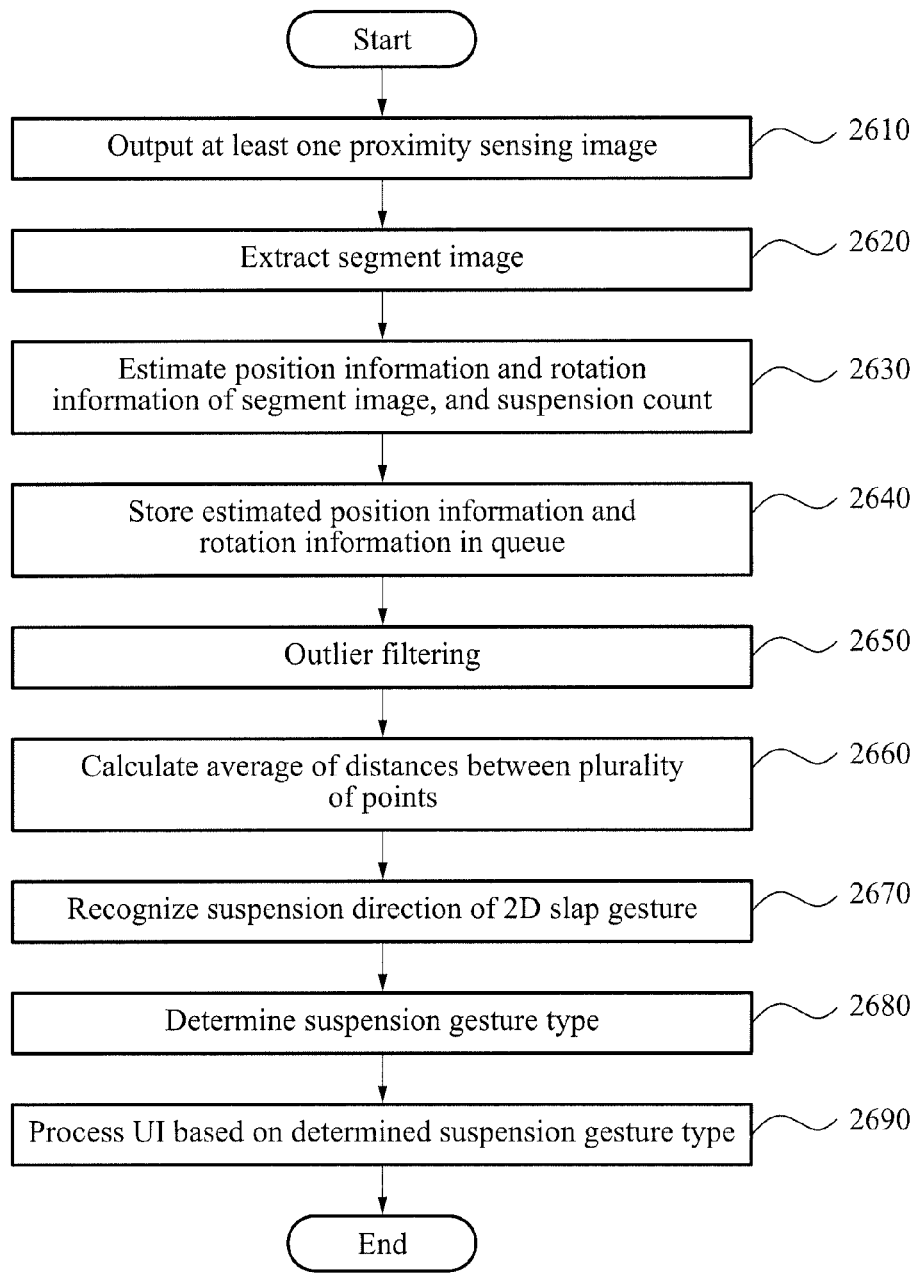

METHOD FOR SUSPENSION SENSING IN INTERACTIVE DISPLAY, METHOD FOR PROCESSING SUSPENSION SENSING IMAGE, AND PROXIMITY SENSING APPARATUS

CROSS-REFERENCE TO RELATED APPLICATIONS

This application claims the priority benefit of Korean Patent Application No. 10-2010-0031798, filed on Apr. 7, 2010, in the Korean Intellectual Property Office, the disclosure of which is incorporated herein by reference.

BACKGROUND

1. Field

One or more embodiments of the present disclosure relate to a method for proximity sensing in an interactive display and a method of processing a proximity sensing image, which may control a three-dimensional (3D) User Interface (UI) using proximity sensing or touch, or both.

2. Description of the Related Art

As a representative User Interface (UI) for interaction between a human being and a computer, a keyboard, a mouse, a touch panel, and the like may be used. For example, in a case of a touch technology used in a touch panel, a user may need to touch the screen to manipulate a UI. Such frequent and continuous touching of the touch panel may result in damage or wear and tear to the screen of the touch panel or user dissatisfaction due to unsanitary conditions arising from such direct contact with the touch panel.

Accordingly, there is a demand for an intuitive interfacing technology where the interaction between the human being and the computer is enhanced to improve user convenience.

SUMMARY

According to an aspect of one or more embodiments, there may be provided a method for proximity-sensing in an interactive display, the method including: suspending, in a three-dimensional (3D) space, at least one hand of a user to manipulate at least one of a viewpoint of the user and a position of a virtual object displayed on a screen; and changing the virtual object by manipulating at least one of the position of the virtual object and the viewpoint of the user based on the suspending.

A gesture type for the suspending may include a two dimensional (2D) slap gesture to suspend the at least one hand of the user in a desired direction of a vertical direction and a horizontal direction to thereby change the virtual object in the desired direction of the vertical direction and the horizontal direction.

The 2D slap gesture may be used when transforming the virtual object to another screen.

The virtual object may be a surface of a hexahedron User Interface (UI), and is transformed to another surface of the hexahedron UI in a suspension direction.

The gesture type for the suspending may include a 3D suspension gesture of moving the at least one hand of the user from a position in a 3D space to another position in a 3D space or to rotate the at least one hand of the user in the 3D position to thereby change the at least one of the position of the virtual object and the viewpoint of the user.

The 3D suspension gesture may include a 3D movement gesture to move the virtual object from the other 3D position to a corresponding position.

When the virtual object is a 3D passage, the 3D suspension gesture may include a forward movement gesture of moving the one hand of the user towards the screen and a backward movement gesture to move the one hand of the user away from the screen.

The gesture type for the suspending may include a 3D six degrees of freedom (DOF) suspension gesture of moving two hands of the user from a current position in a 3D space to another position in the 3D position, or to rotate the two hands of the user in the current 3D position.

The 3D six DOF suspension gesture may include suspending the two hands of the user to manipulate a position or a rotation direction of the virtual object.

The 3D six DOF suspension gesture may include holding a virtual manipulation object displayed on a 3D display using the two hands of the user to manipulate a position or a rotation direction of the virtual manipulation object.

The virtual object may be displayed in a tilt manner depending on a position of the moved two hands of the user.

The gesture type for the suspending may include a touch and suspending gesture to touch the virtual object using one hand of the user and to suspend the virtual object using the other hand of the user.

The touch and suspending gesture may include touching the virtual object or a background of the virtual object using one hand of the user and to suspend the virtual object or the background using the other hand of the user, so that the background and a position or rotation of the virtual object are manipulated.

The gesture type for the suspending may include a zoom-touch and suspension gesture to zoom in on a displayed UI when touching the displayed UI using one hand of the user, and to zoom out of the displayed UI when suspending the displayed UI.

According to another aspect of one or more embodiments, there may be provided a method of processing a proximity sensing image, the method including: outputting a proximity sensing image by 2D or 3D proximity-sensing at least one hand of a user performing a suspending in a 3D space; extracting a segment image corresponding to the at least one hand by removing noise of the outputted proximity sensing image; and estimating position information, rotation information, and a suspension count of the segment image with respect to a center point of the extracted segment image.

The estimating may determine the center point of the segment image as x and y coordinates of the segment image, and obtain a z coordinate using a size of the segment image to estimate the position information.

The estimating may estimate rotation information regarding an x-axis, a y-axis, and a z-axis using a luminous intensity difference between pixels of the segment image.

The method may further include: storing the estimated position information and rotation information of the segment image in multiple queues; determining a suspension gesture type based on the stored position information and rotation information of the segment image and the estimated suspension count; and changing at least one of a position and a rotation direction of a UI displayed on a screen based on the determined suspension gesture type.

The storing may store, in a queue corresponding to the at least one hand of the user performing the suspending from among the multiple queues, position information and rotation information of the segment image.

The method may further include: removing protruded points from a plurality of points existing between a current position and a subsequent position, using a standard deviation of distances among the plurality of points, when the at least one hand is moved from the current position to the next position by the performed suspending.

The method may further include: calculating, in x-axis and y-axis directions, an average of distances among a plurality of points existing between a current position and a next position, when the at least one hand is moved from the current position to the next position by the performed suspending; and recognizing a suspension direction of a 2D slap gesture type to suspend one hand of the user in a desired direction of a vertical direction and a horizontal direction by comparing the calculated two averages.

When the suspension direction is not recognized, the determining of the suspension gesture type may determine the suspension gesture type being structured in six degrees of freedom, using the estimated suspension count and information regarding whether a touch is performed on the screen.

According to another aspect of one or more embodiments, a proximity-sensing apparatus used with an interactive display displaying a virtual object is provided. The proximity-sensing apparatus includes a suspension sensor to sense a user's hand, which is suspended in a three-dimensional (3D) space, a suspension image processing unit to estimate suspension information including at least one of position information of the user's hand and rotation information of the user's hand based on the sensing of the user's hand, and a user interface processing unit to change the virtual object by manipulating at least one of a position of the virtual object and a viewpoint of the user based on the estimated suspension information.

According to one or more embodiments, there is provided a method for proximity sensing in an interactive display and a method of processing a proximity sensing image, so that it is possible to provide a three-dimensional (3D) interaction where an actual space is utilized, by manipulating a UI of a display through proximity sensing. Also, it is possible to minimize a damage occurring due to a touch operation, by manipulating a UI without directly contacting a display.

Also, there is provided a 3D gesture interaction where a six degree of freedom (DOF) manipulation is possible through proximity sensing of at least one hand of a user. Specifically, a position and rotation of a 3D UI may be manipulated through the proximity sensing using hands of the user.

Also, it is possible to readily manipulate a 3D object by manipulating a 3D UI using a combination of touch sensing and proximity sensing.

Also, it is possible to extract a suspension image with an improved image quality by removing noise from a proximity sensing image with a low resolution without using a separate depth camera.

Also, it is possible to improve user's convenience by manipulating a 3D UI using proximity sensing of hands of a plurality of users, based on a multi-queue, regardless of a number of the users.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 26 is a flowchart illustrating a method where an interactive display apparatus processes a proximity sensing image.

DETAILED DESCRIPTION

Figure 1:
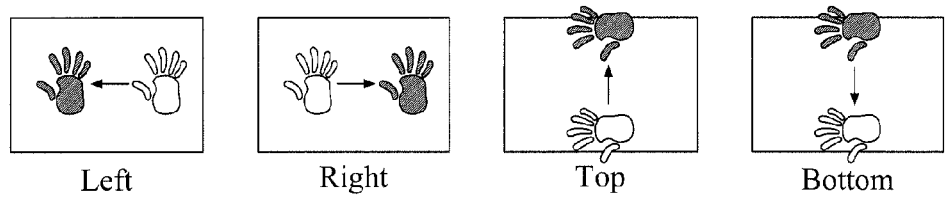
FIG. 1 is a diagram used for describing a two-dimensional (2D) slap gesture.

Reference will now be made in detail to embodiments, examples of which are illustrated in the accompanying drawings, wherein like reference numerals refer to like elements throughout. Embodiments are described below to explain the present disclosure by referring to the figures.

Figure 2A:
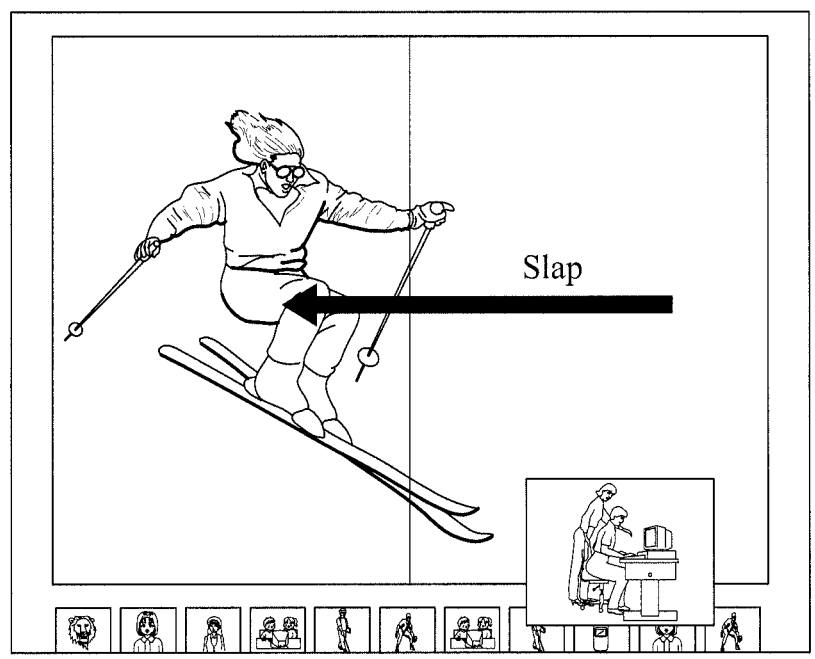
FIGS. 2A and 2B are diagrams used for describing a User Interface (UI) where a 2D slap gesture is applied.
Figure 2B:
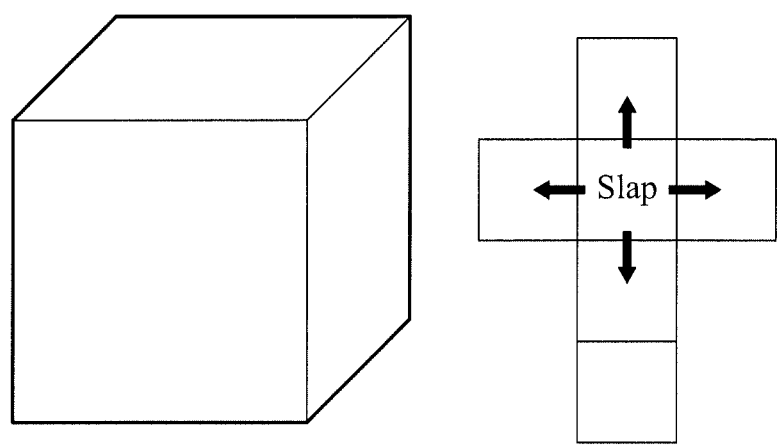

FIG. 1 is a diagram used for describing a two-dimensional (2D) slap gesture, and FIGS. 2A and 2B are diagrams used for describing a User Interface (UI) where a 2D slap gesture is applied.

As illustrated in FIG. 1, the 2D slap gesture may be a gesture in which a hand of a user is suspended in a three-dimensional (3D) space in order to manipulate a position of a virtual object displayed on a screen. The virtual object may be a UI displayed on the screen or an object such as an avatar, for example, an avatar within the UI. To change the virtual object in a direction desired by the user, such as a vertical direction and a horizontal direction (top, bottom, left, and right), the user may move at least one hand in the desired direction, for example, in the horizontal direction or the vertical direction, or both. The 2D slap gesture may also include moving the displayed hand in a diagonal direction. The user need not touch the screen in order to perform the slap gesture.

The 2D slap gesture may be used for thumbing through pages of a book as illustrated in FIG. 2A, and used for changing a surface of a hexahedral object as illustrated in FIG. 2B. In FIG. 2B, the virtual object displayed on the screen may be a surface of a hexahedral UI, and the surface of the hexahedral UI may be changed to another surface of the hexahedral UI according to a direction in which the displayed hand is suspended.

Figure 3:
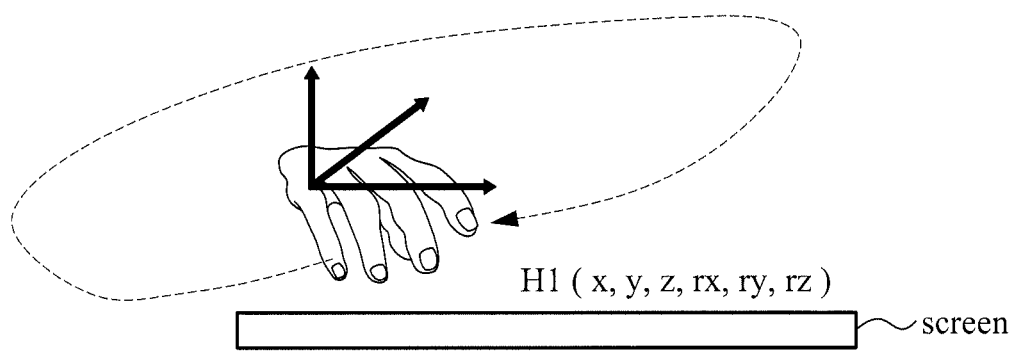
FIG. 3 is a diagram used for describing a three-dimensional (3D) suspension gesture.
Figure 4A:
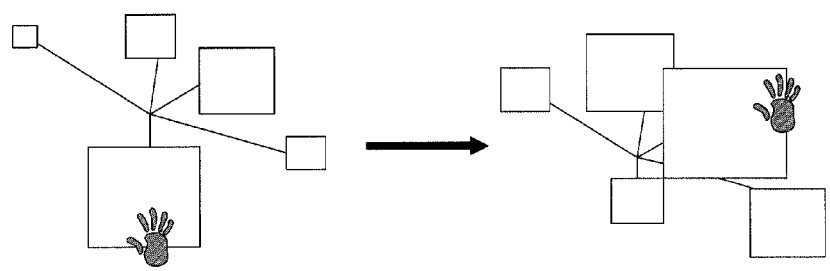
FIGS. 4A and 4B are diagrams used for describing a UI where a 3D suspension gesture is applied.
Figure 4B:
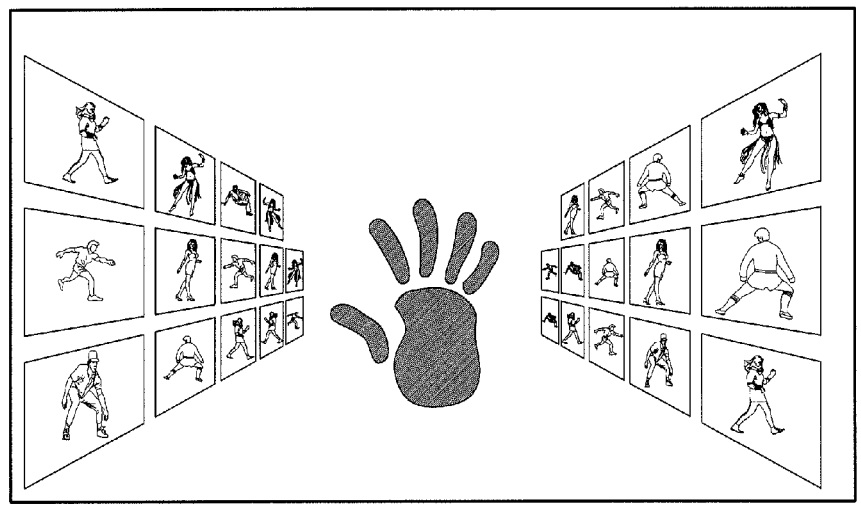

FIG. 3 is a diagram used for describing a three-dimensional (3D) suspension gesture, FIGS. 4A and 4B are diagrams used for describing a UI where a 3D suspension gesture is applied.

As illustrated in FIG. 3, the 3D suspension gesture may include suspending a hand of a user to manipulate at least one of a position of the virtual object and one or more viewpoints of the user in a 3D space. Specifically, the 3D suspension gesture may include moving a hand of the user from a current position in the 3D space to another position in the 3D space, or may include rotating the hand of the user from the current position to change a viewpoint of the user or a virtual camera. In FIG. 3, (x,y,z) of H1 (x,y,z,rx,ry,rz) denotes suspended position coordinates, and (rx,ry,rz) denotes suspended rotation information.

The 3D suspension gesture may include a 3D movement gesture, a forward movement gesture, and a backward movement gesture.

As illustrated in FIG. 4A, the 3D movement gesture may move or rotate a virtual object displayed on the screen towards a different position in the 3D space. Specifically, a position or a rotation direction of the virtual object in the 3D space may be changed by the 3D movement gesture.

Figure 5:
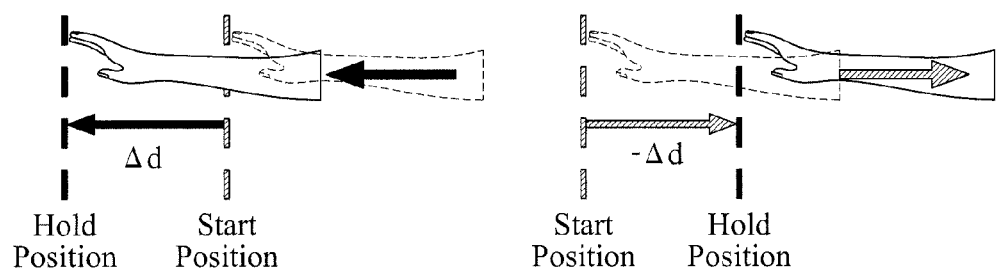
FIG. 5 is a diagram used for describing a movement distance of a forward movement gesture and a backward movement gesture.

As illustrated in FIG. 4B, the forward movement gesture and the backward movement gesture may be used to "walk forward" or to "walk backward" in a virtual 3D passage such as a passage browser. As illustrated in FIG. 5, when a UI displayed on the screen is the 3D passage, the forward movement gesture may include moving a hand of the user towards the screen and the backward gesture may include moving a hand of the user away from the screen. As a further example, a movement distance (Δd) of the forward movement gesture may be used as an acceleration value of the UI, and a movement distance (−Δd) of the backward gesture may be used as a reduction value of the UI. Δd and −Δd may be a distance between a start position and a hold position of the forward movement gesture.

Figure 6:
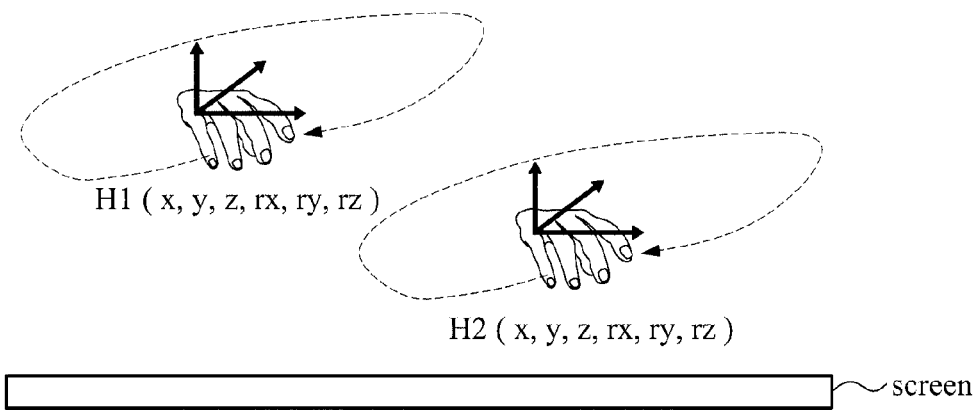
FIG. 6 is a diagram used for describing a 3D six degree of freedom (DOF) suspension gesture.

FIG. 6 is a diagram used for describing a 3D six degree of freedom (DOF) suspension gesture.

Referring to FIG. 6, a 3D six degree of freedom (DOF) suspension gesture may include moving two hands of the user from a current position in a 3D space (referred to as "current 3D position") to another position in the 3D space (referred to as "another 3D position"), or of rotating the two hands in the current 3D position to change a viewpoint of the user or a position of a virtual object. The two hands may include the hands of a single user or the hands of different users.

Specifically, the 3D six DOF suspension gesture may include manipulating the position or a rotation direction of the virtual object while holding the virtual object using two hands of the user in the 3D space. Alternatively, the 3D six DOF suspension gesture may include manipulating the position or the rotation direction of the virtual object while holding, in the 3D space by the user, the virtual object displayed in a 3D display.

Changes in a movement of the virtual object displayed on the 3D display or in the viewpoint of the user may be respectively expressed as six DOF. Here, the change in the viewpoint of the user may correspond to a movement of a camera. The six DOF may include a movement in an x-axis direction, a movement in a y-axis direction, a movement in a z-axis direction, a pitch with respect to the x-axis, a yaw with respect to the y-axis, and a roll with respect to the z-axis. Accordingly, (x,y,z) of H1(x,y,z,rx,ry,rz) and H2 (x,y,z,rx,ry,rz) may denote suspended position coordinates, and (rx,ry,rz) denotes suspended rotation information.

Figure 7:
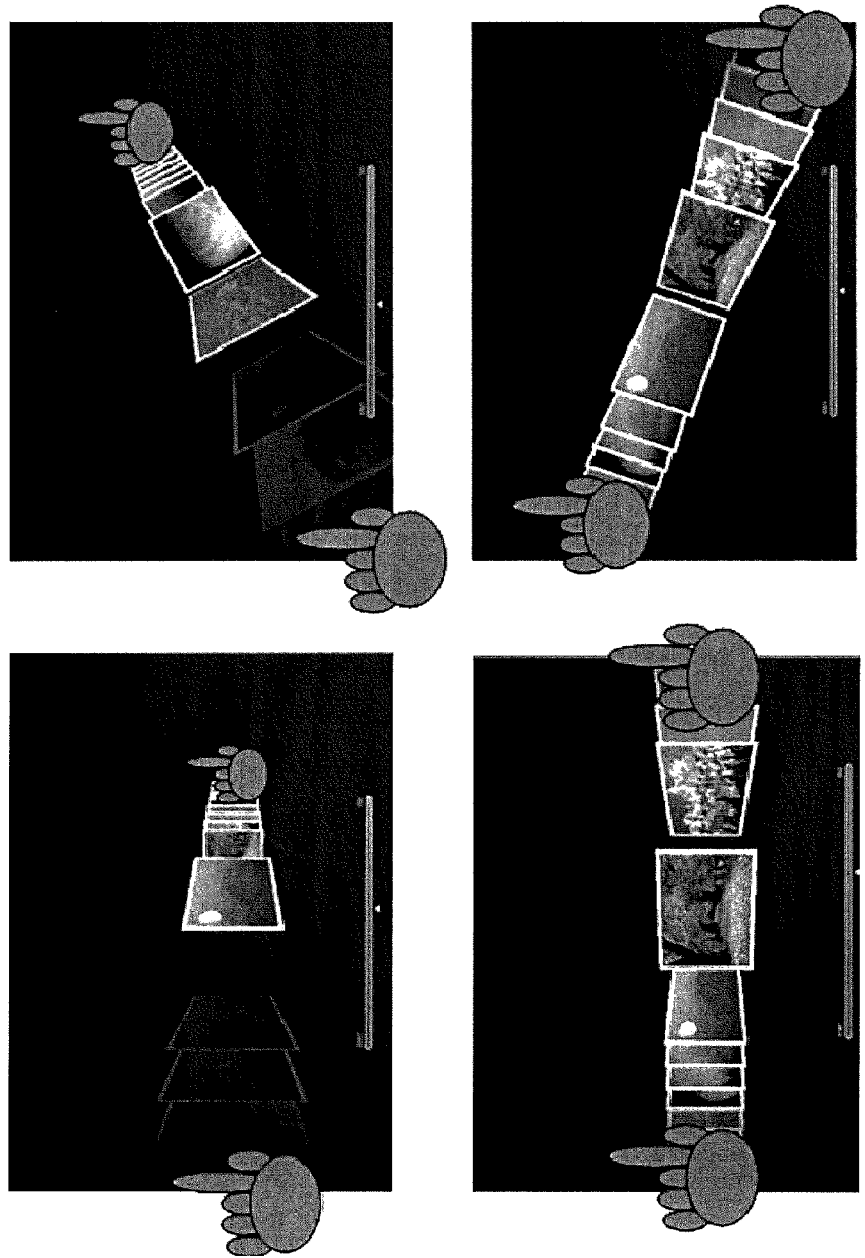
FIG. 7 is a diagram used for describing UIs where a 3D six DOF suspension gesture is applied.

As illustrated in FIG. 7, when the UI is displayed on the screen, the 3d six DOF suspension gesture may be displayed in a tilt manner depending on a position of the two hands of the user after they have moved. In this instance, the sizes of the two ends of the spread cards may be compared with each other in perspective. The hand symbols may indicate the positions of the hands from a display screen. That is, bigger hand symbol may indicate far position of the hand from a display screen than smaller hand symbol. Or smaller hand symbol may indicate far position of the hand from a display screen than bigger hand symbol.

Figure 8:
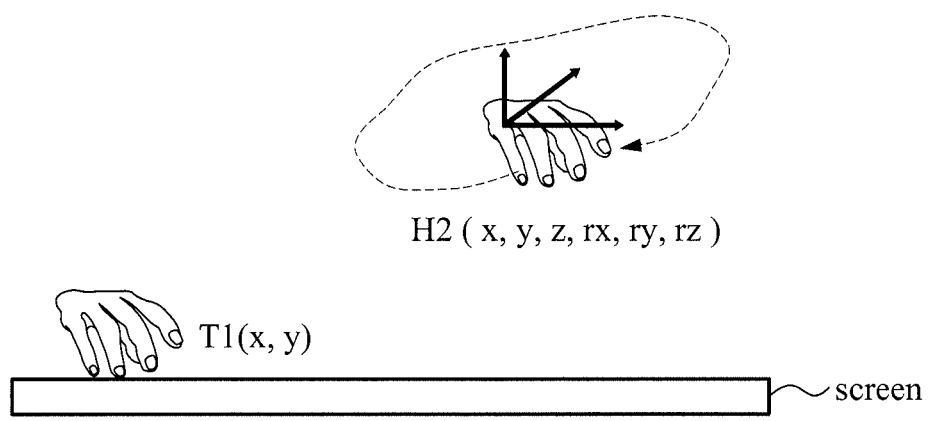
FIG. 8 is a diagram used for describing an example of a touch and suspension gesture.
Figure 9A:
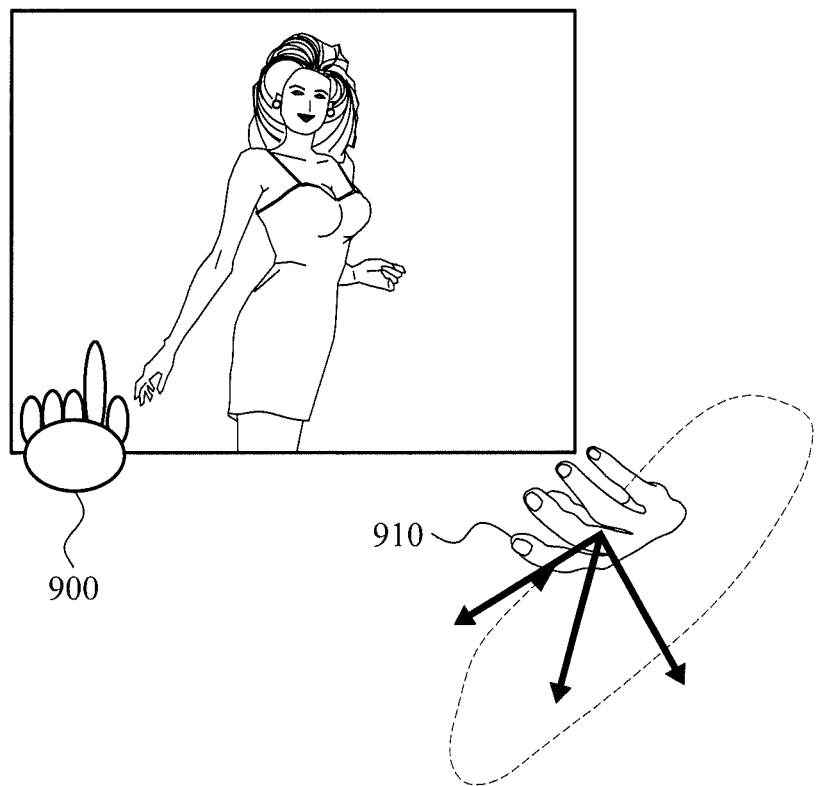
FIGS. 9A and 9B are diagrams used for describing a UI where a touch and suspension gesture is applied.
Figure 9B:
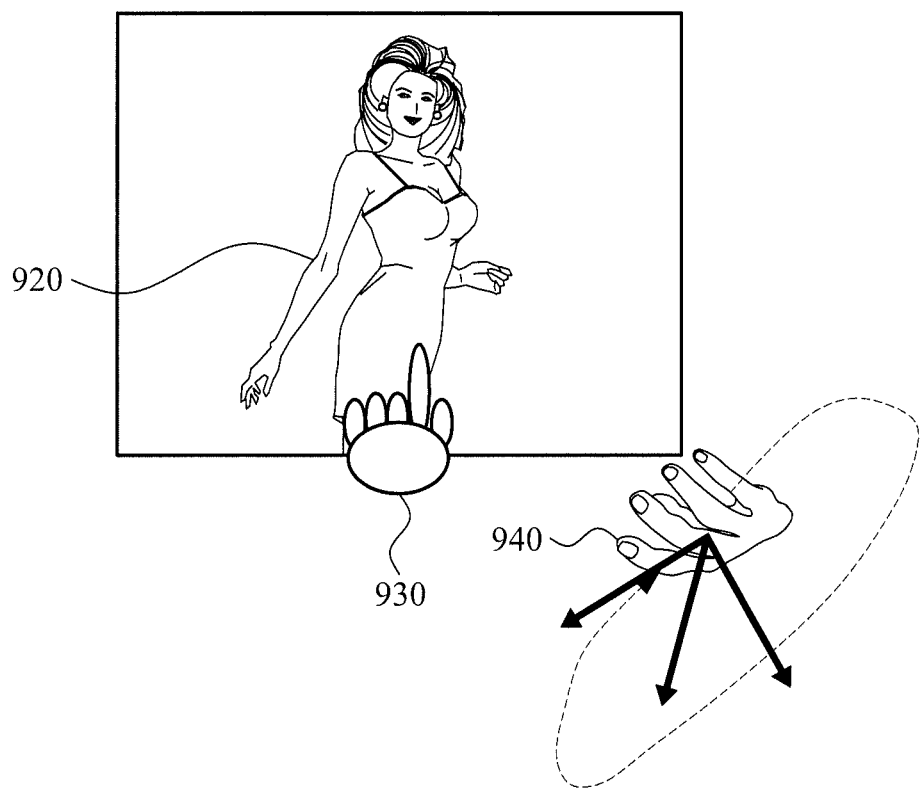

FIG. 8 is a diagram used for describing an example of a touch and suspension gesture, and FIGS. 9A and 9B are diagrams used for describing a UI where a touch and suspension gesture is applied.

Referring to FIG. 8, the touch and suspension gesture may include touching a UI displayed on a screen using a first hand of the user while suspending the other hand of the user. T1(x,y) denotes touched position coordinates, and also denotes suspended position coordinates and rotation information of H2(x,y,z,rx,ry,rz).

Referring to FIG. 9A, a viewpoint of the user may be changed by touching a background of the UI displayed on the screen using a first hand 900 of the user while suspending the other hand 910 of the user. Specifically, the touch and suspension gesture may manipulate a position and rotation direction of a camera while suspending the other hand of the user, so that a position and rotation direction of the background may be changed.

Referring to FIG. 9B, a position and a rotation direction of an avatar 920 of a UI displayed on the screen may be changed by touching the avatar 920 using a first hand 930 of the user while suspending the other hand 940 of the user. In this instance, the background may be fixed. Also, the avatar 920 may be a virtual object displayed on a 3D space.

Figure 10:
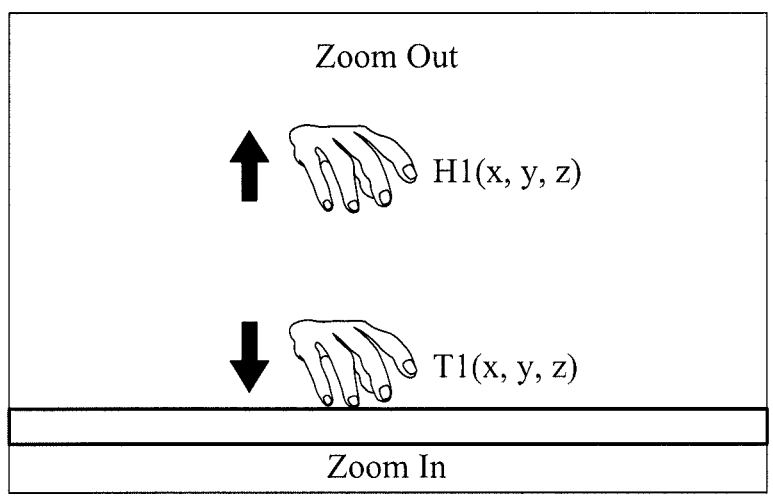
FIG. 10 is a diagram used for describing another example of a touch and suspension gesture.
Figure 11A:
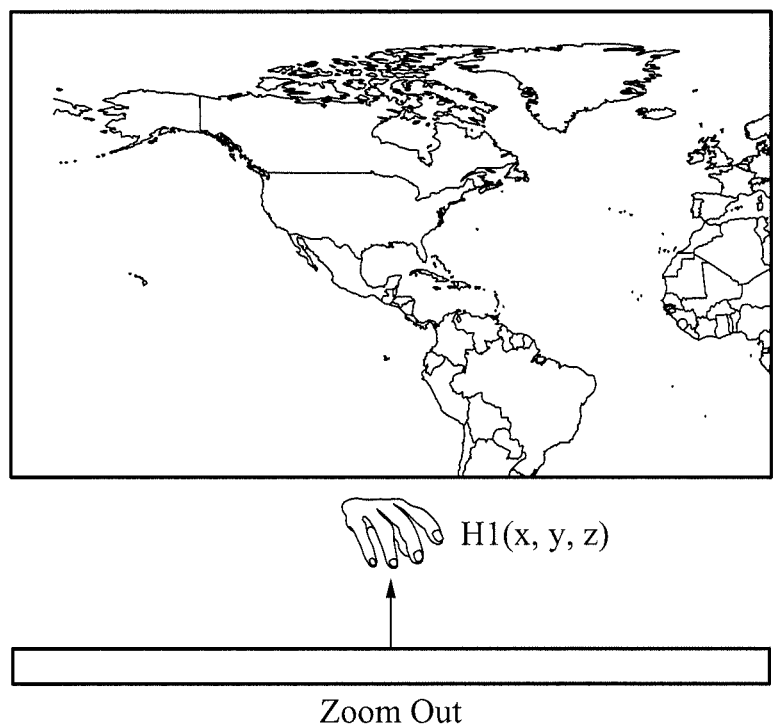
FIGS. 11A and 11B are diagrams used for describing a UI where the touch and suspension gesture of FIG. 10 is applied.
Figure 11B:
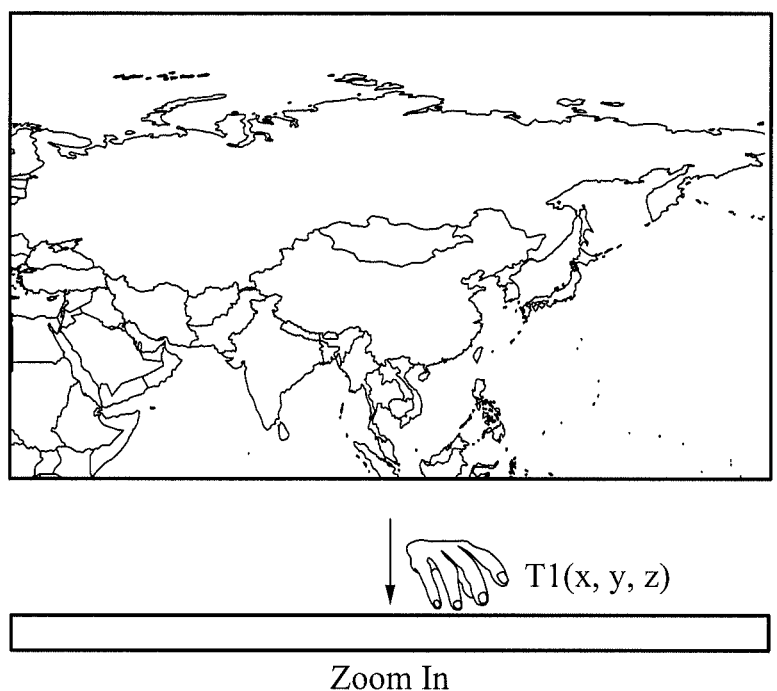

FIG. 10 is a diagram used for describing another example of a touch and suspension gesture, and FIGS. 11A and 11B are diagrams used for describing a UI where the touch and suspension gesture of FIG. 10 is applied.

Referring to FIG. 10, a seamless touch and suspension gesture may be used as a seamless interaction for a zoomable User interface (UI). Specifically, when touching a UI displayed on a screen using a hand of the user, the seamless touch and suspension gesture may zoom in on the displayed UI, and when a hand of the user is suspended in a 3D space perpendicular to the screen, for example, directly above the screen, the seamless touch and suspension gesture may zoom out of the UI. Alternatively, when touching a UI displayed on a screen using a hand of the user, the seamless touch and suspension gesture may zoom out of the displayed UI, and when a hand of the user is suspended in a 3D space perpendicular to the screen, the seamless touch and suspension gesture may zoom in on the UI.

In the case when the hand touches the screen, a degree of zooming in may be determined, for example, using one or more of a duration of the touch, a touch pressure, a touch area, a light intensity of the touch, and the like. Also, in the case of the suspension, a degree of zooming out may be determined, for example, using one or more of a sensed light intensity reflected by a hand, capacitive intensity, and the like.

Referring to FIG. 11A, a world map may be zoomed out by suspending a hand of the user towards a position of H1(x,y,z). Referring to FIG. 11B, the world map may be zoomed in by touching the hand of the user towards a position T1(x,y,z) on the display.

Figure 12:
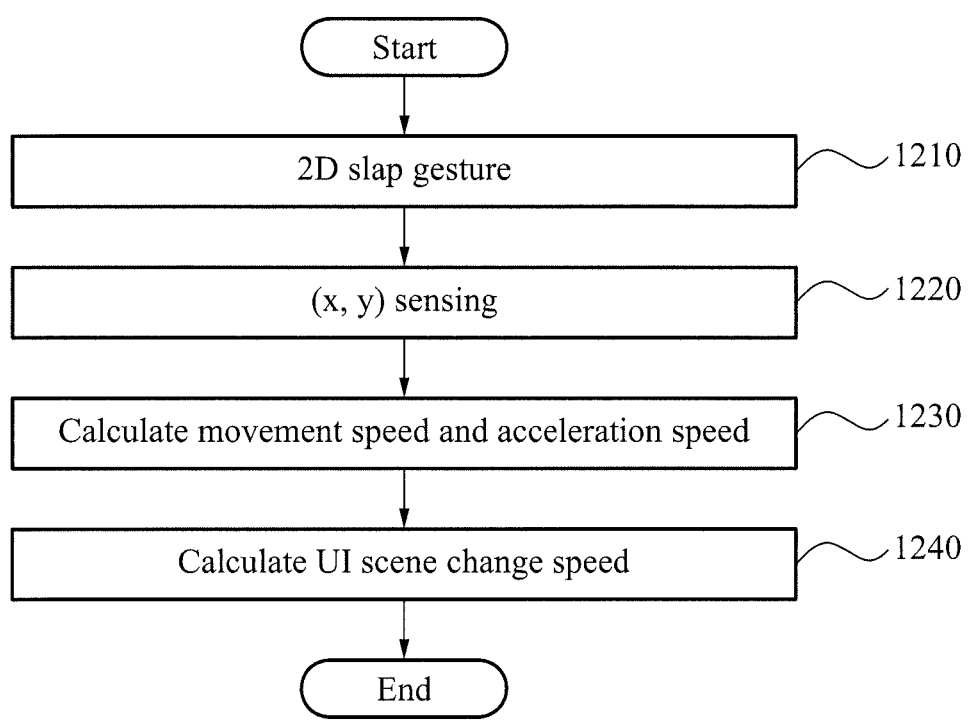
FIG. 12 is a flowchart illustrating a process where a recognized 2D slap gesture is physically applied to a UI.

FIG. 12 is a flowchart illustrating a process where a recognized 2D slap gesture is physically applied to a UI.

Referring to FIG. 12, when a gesture type is a 2D slap gesture determined by a suspension of a user in operation 1210, a 3D display apparatus may sense a suspended position coordinates, that is, (x, y) in operation 1220.

In operation 1230, the 3D display may calculate a suspension speed, that is, a movement speed of a hand using the sensed (x, y), and calculate a movement acceleration speed.

In operation 1240, the 3D display apparatus may calculate a scene change speed of a UI displayed on a screen based on the calculated movement speed and the movement acceleration speed, and apply the calculated scene change speed to an effect.

Here, the effect denotes a special effect such as a motion blur and the like for scene change.

Figure 13:
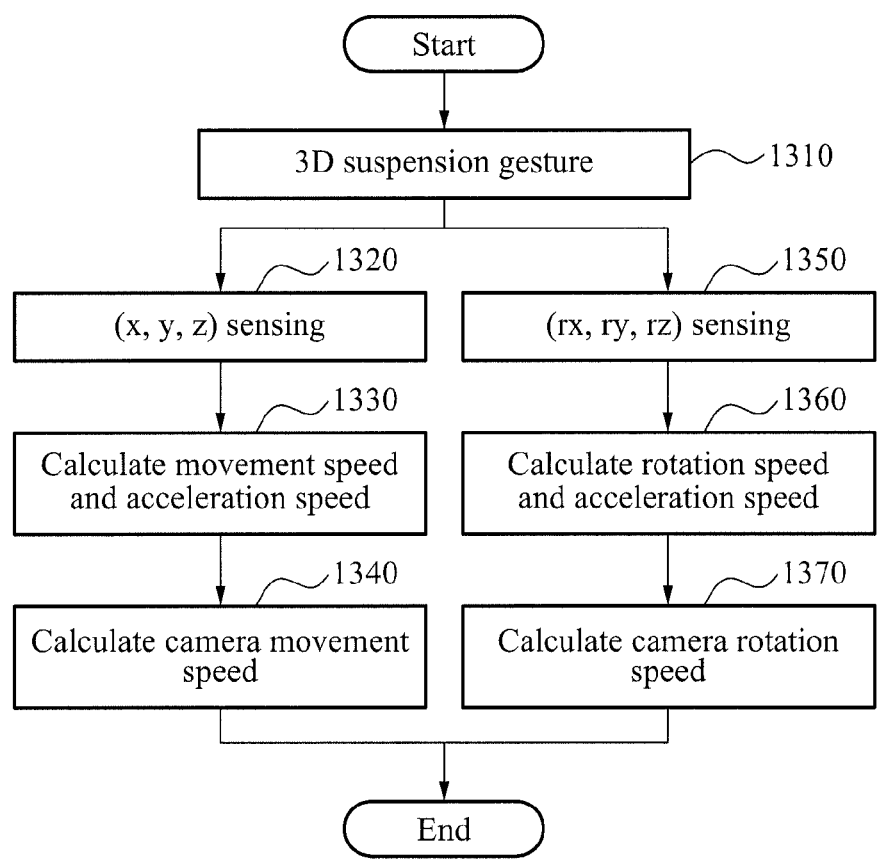
FIG. 13 is a flowchart illustrating a process where a recognized 3D suspension gesture is physically applied to a UI.

FIG. 13 is a flowchart illustrating a process where a recognized 3D suspension gesture is physically applied to a UI.

Referring to FIG. 13, in operation 1310, a gesture type recognized by a suspension of a user may be a 3D suspension gesture.

In operation 1320, a 3D display apparatus may sense the suspended position coordinates, that is, (x, y, z).

In operation 1330, the 3D display apparatus may calculate a suspension speed, that is, a movement speed and a movement acceleration speed of a hand, using the sensed (x, y, z).

In operation 1340, the 3D display apparatus may calculate a movement speed of a camera based on the movement speed and the movement acceleration speed of the hand which are calculated in operation 1330, and apply the calculated movement speed of the camera to an effect.

The movement speed of the camera may denote a speed where a viewpoint of the user is changed or a virtual object is moved.

In operation 1350, the 3D display apparatus may sense a rotation direction (rx, ry, rz) by the suspension. Operation 1350 may be simultaneously performed together with operation 1320, or performed after operation 1320 is performed.

In operation 1360, the 3D display apparatus may calculate a rotation speed and a rotation acceleration speed of a hand using the sensed rotation direction (rx, ry, rz).

In operation 1370, the 3D display apparatus may calculate a rotation speed of a camera based on the rotation speed and the rotation acceleration speed of the hand which are calculated in operation 1360, and apply the calculated rotation speed to an effect.

The rotation speed of the camera may denote a speed where a virtual object is rotated.

Figure 14:
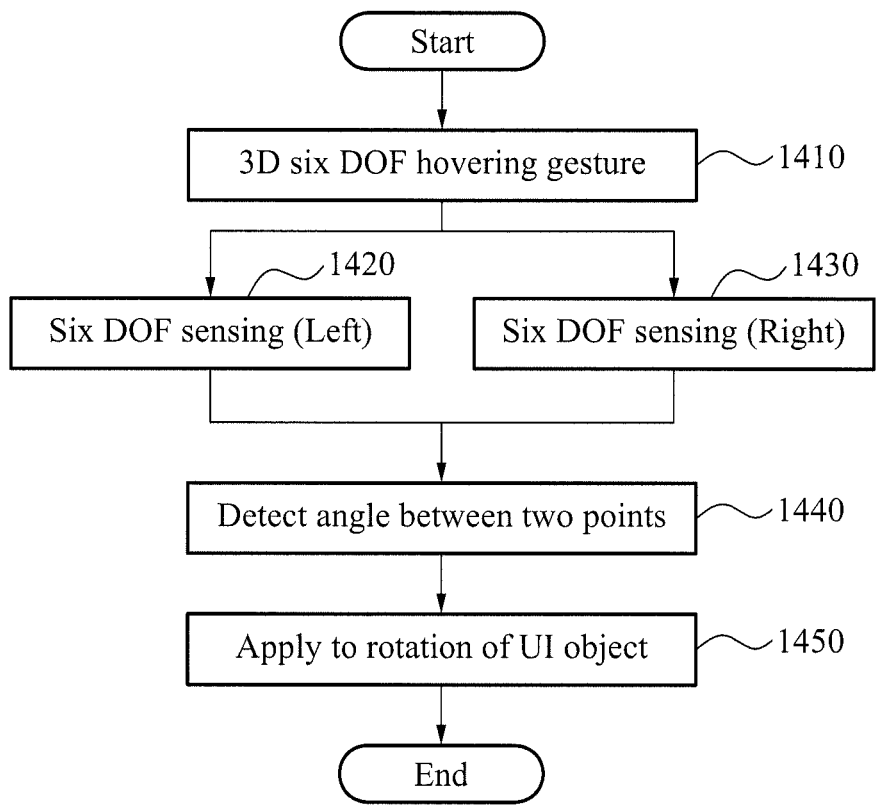
FIG. 14 is a flowchart illustrating a process where a recognized 3D six DOF suspension gesture is physically applied to a UI.

FIG. 14 is a flowchart illustrating a process where a recognized 3D six DOF suspension gesture is physically applied to a UI.

In operation 1410, a gesture type recognized by a suspension of hands of a user may be a 3D six degree of freedom (DOF) suspension gesture.

In operation 1420, the 3D display apparatus may sense coordinates of a point where a left hand of the user is suspended, that is, a six DOF (x,y,z,rx,ry,rz).

In operation 1430, the 3D display apparatus may sense coordinates of a point where a right hand of the user is suspended, that is, the six DOF (x,y,z,rx,ry,rz).

In operation 1440, the 3D display apparatus may detect an angle between the two points sensed in operations 1420 and 1430.

In operation 1450, the 3D display apparatus may apply the detected angle to a rotation of the virtual object of the UI of FIG. 7A.

Figure 15:
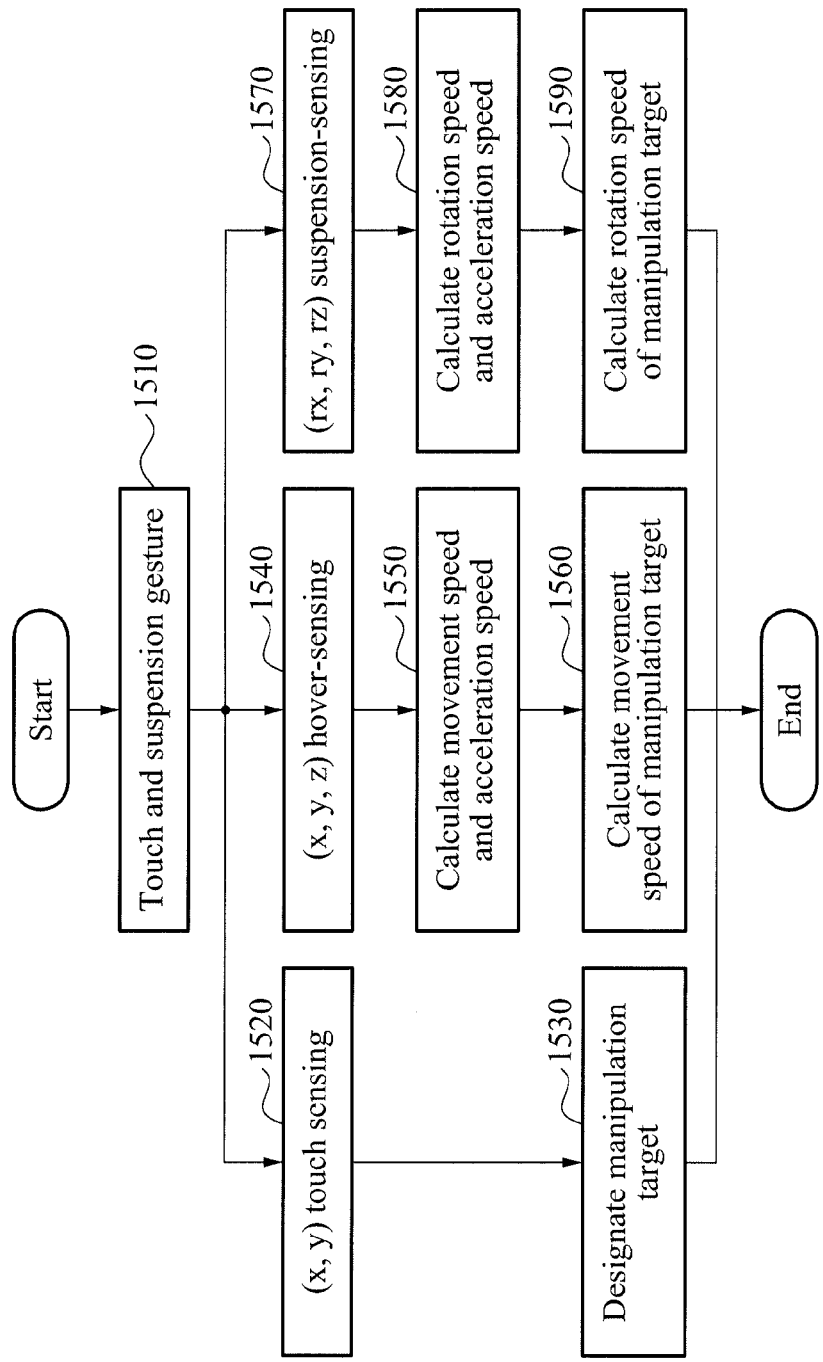
FIG. 15 is a flowchart illustrating an example of a process where a recognized touch and suspension gesture is physically applied to a UI.

FIG. 15 is a flowchart illustrating an example of a process where a recognized touch and suspension gesture is physically applied to a UI.

In operation 1510, a gesture type recognized by a movement of one or more hands of a user may be a touch and suspension gesture.

In operation 1520, a 3D display apparatus may sense coordinates (x, y) of a position touched by a hand of the user.

In operation 1530, the 3D display apparatus may determine a virtual object to be manipulated in a UI displayed on a screen, based on the sensed coordinates (x, y).

In operation 1540, the 3D display apparatus may sense coordinates (x, y, z) of a position where the other hand of the user is suspended.

In operation 1550, the 3D display apparatus may calculate a suspension speed, that is, a movement speed and a movement acceleration speed of a hand, based on the sensed (x, y, z).

In operation 1560, the 3D display apparatus may calculate a movement speed of the virtual object determined in operation 1530, based on the movement speed and the movement acceleration speed which are calculated in operation 1550, and apply the calculated movement speed to create an effect, for example, a movement effect of the virtual object.

In operation 1570, the 3D display apparatus may sense a rotation direction (rx, ry, rz) by a suspension of the other hand.

In operation 1580, the 3D display apparatus may calculate a rotation speed and a rotation acceleration speed of the hand using the sensed rotation direction (rx, ry, rz).

In operation 1590, the 3D display apparatus may calculate a rotation speed of the virtual object based on the rotation speed and the rotation acceleration speed of the hand which are calculated in operation 1580, and apply the calculated rotation speed to create an effect, for example, a rotation effect of the virtual object.

Figure 16:
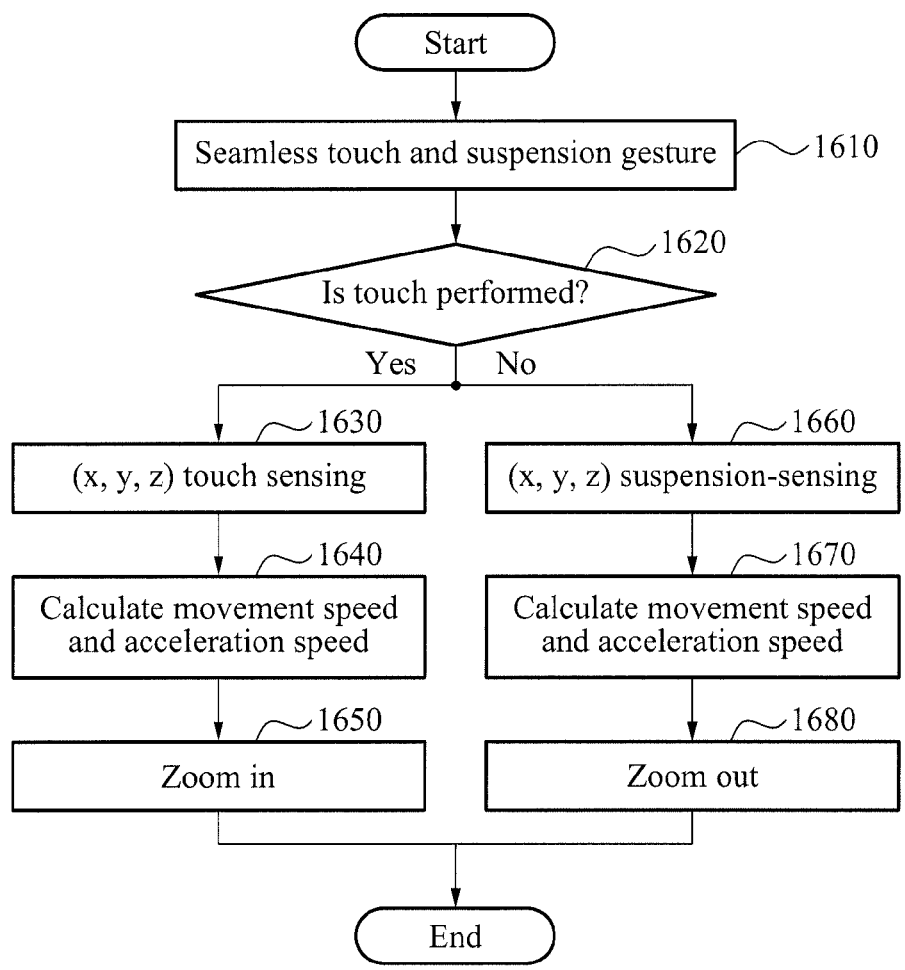
FIG. 16 is a flowchart illustrating another example of a process where a recognized touch and suspension gesture is physically applied to a UI.

FIG. 16 is a flowchart illustrating another example of a process where a recognized touch and suspension gesture is physically applied to a UI.

In operation 1610, a gesture type recognized by a movement of one or more hands of a user may be a suspension gesture.

When a hand of the user touches a screen in operation 1620, a 3D display apparatus may sense coordinates (x, y, z) of a position touched by a hand of the user in operation 1630.

In operation 1640, the 3D display apparatus may calculate a movement speed and a movement acceleration speed of a hand for touch, based on the sensed coordinates (x, y, z).

In operation 1650, the 3D display apparatus may calculate a zoom rate-conversion rate based on the calculated movement speed and the movement acceleration speed, and zoom in on a displayed UI using the calculated zoom rate-conversion rate.

Conversely, when the hand of the user is suspended in a direction perpendicular to the screen in operation 1620, the 3D display apparatus may sense the suspended coordinates (x, y, z) in operation 1660.

In operation 1670, the 3D display apparatus may calculate a suspension speed and a suspension acceleration speed based on the coordinates (x, y, z) sensed in operation 1660.

In operation 1680, the 3D display apparatus may calculate a zoom rate conversion rate based on the calculated suspension speed and suspension acceleration speed, and zoom out of the UI using the calculated zoom rate conversion rate.

Figure 17:
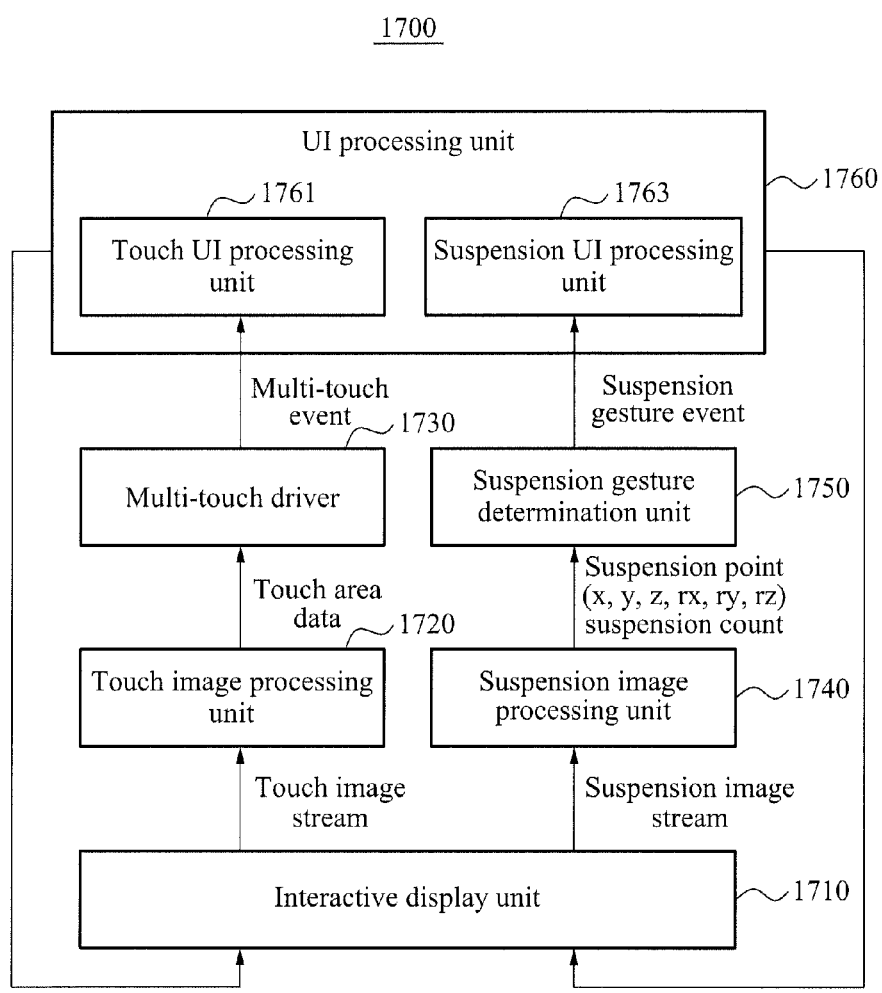
FIG. 17 is a block diagram illustrating an interactive display apparatus where proximity sensing is possible.

FIG. 17 is a block diagram illustrating an interactive display apparatus where proximity sensing is possible.

Referring to FIG. 17, an interactive display apparatus 1700 may include, for example, an interactive display unit 1710, a touch image processing unit 1720, a multi-touch driver 1730, a suspension image processing unit 1740, a suspension gesture determination unit 1750, and a UI processing unit 1760.

The interactive display unit 1710 may display a UI including a background and a virtual object. The interactive display unit 1710 may include a touch sensor that recognizes a multi-touch of a user and a suspension sensor for proximity sensing.

The touch sensor may sense a touch on the interactive display unit 1710 performed by the user, and output a touch image stream. The suspension sensor may 2D or 3D proximity-sense at least one hand suspended in a 3D space adjacent to a surface of the interactive display unit 1710, and output a proximity sensing image. Hereinafter, the proximity sensing image may be referred to as a suspension image stream.

The touch image processing unit 1720 may generate touch area data indicating a position of a touch area, based on the touch image stream obtained by the touch sensor.

When a plurality of users simultaneously perform a multi-touch, a number of the touch area data may correspond to a number of the users. The touch area data may include x-axis coordinates and y-axis coordinates.

The multi-touch driver 1730 may receive the touch area data from the touch image processing unit 1720. The multi-touch driver 1730 may generate a corresponding touch event by analyzing the touch area data. When the number of the touch area data is plural, the multi-touch driver 1730 may generate a multi-touch event.

The suspension image processing unit 1740 may estimate position information and rotation information of the suspension image, and a suspension count, based on the suspension image stream obtained by the suspension sensor. The position information of the suspension image may be (x, y, z)

coordinates, and the rotation information may be (rx,ry,rz). Hereinafter, information combining the position information and the rotation information may be referred to as point coordinates. Here, the suspension image may be a segment image which will be described later.

Figure 18:
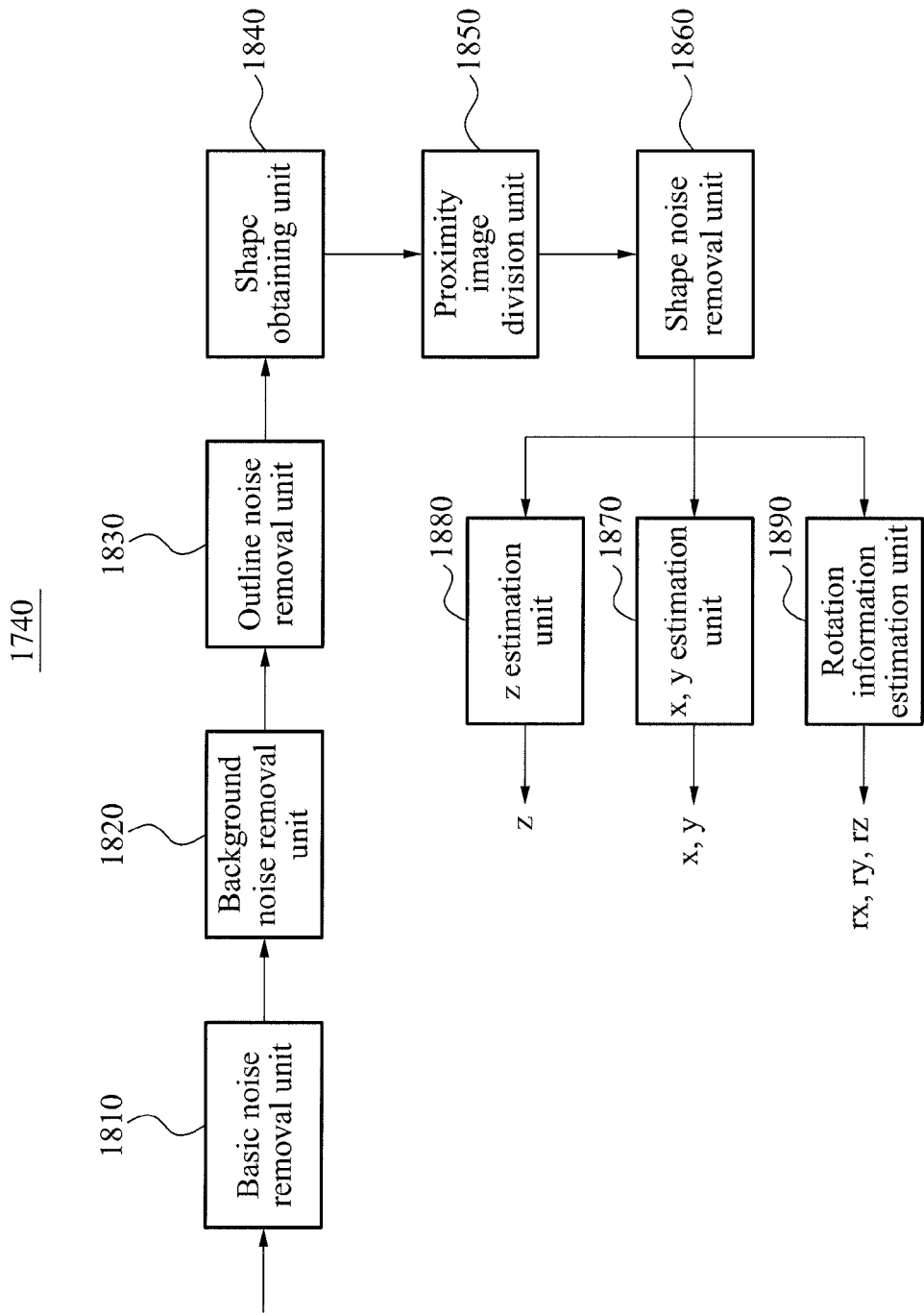
FIG. 18 is a block diagram illustrating a suspension image processing unit of FIG. 17.

FIG. 18 is a block diagram illustrating a suspension image processing unit of FIG. 17.

Referring to FIG. 18, a suspension image processing unit 1740 may include, for example, a basic noise removal unit 1810, a background noise removal unit 1820, an outline noise removal unit 1830, a shape obtaining unit 1840, a proximity image segmentation unit 1850, a shape noise removal unit 1860, an x and y estimation unit 1870, a z estimation unit 1880, and rotation information estimation unit 1890.

The basic noise removal unit 1810 may receive a suspension image stream obtained by suspension sensing. The basic noise removal unit 1810 may apply a threshold and smoothing operation to the suspension image stream to thereby remove basic noise.

The background noise removal unit 1820 may apply noise masking to the stream inputted from the basic noise removal unit 1810 to thereby remove background noise. The background noise may be noise generated by an effect of interference light.

The outline noise removal unit 1830 may apply a morphological operation to the stream inputted from the background noise removal unit 1820 to thereby remove noise of an image outline.

A shape obtaining unit 1840 may obtain a shape of a suspension image inputted from the outline noise removal unit 1830.

The shape of the suspension image may be a shape of a hand of a user performing a suspension.

The proximity image segmentation unit 1850 may separate the suspension image from the stream inputted from the shape obtaining unit 1840. For example, when two suspension images are overlapped, the proximity image segmentation unit 1850 may segment the overlapped suspension images into two parts. In this case, a suspension count may be two.

The shape noise removal unit 1860 may remove a shape recognized as a smaller size from the segmented suspension images, and thereby may prevent misrecognition when calculating position coordinates of the segmented suspension images from occurring.

Figure 19:
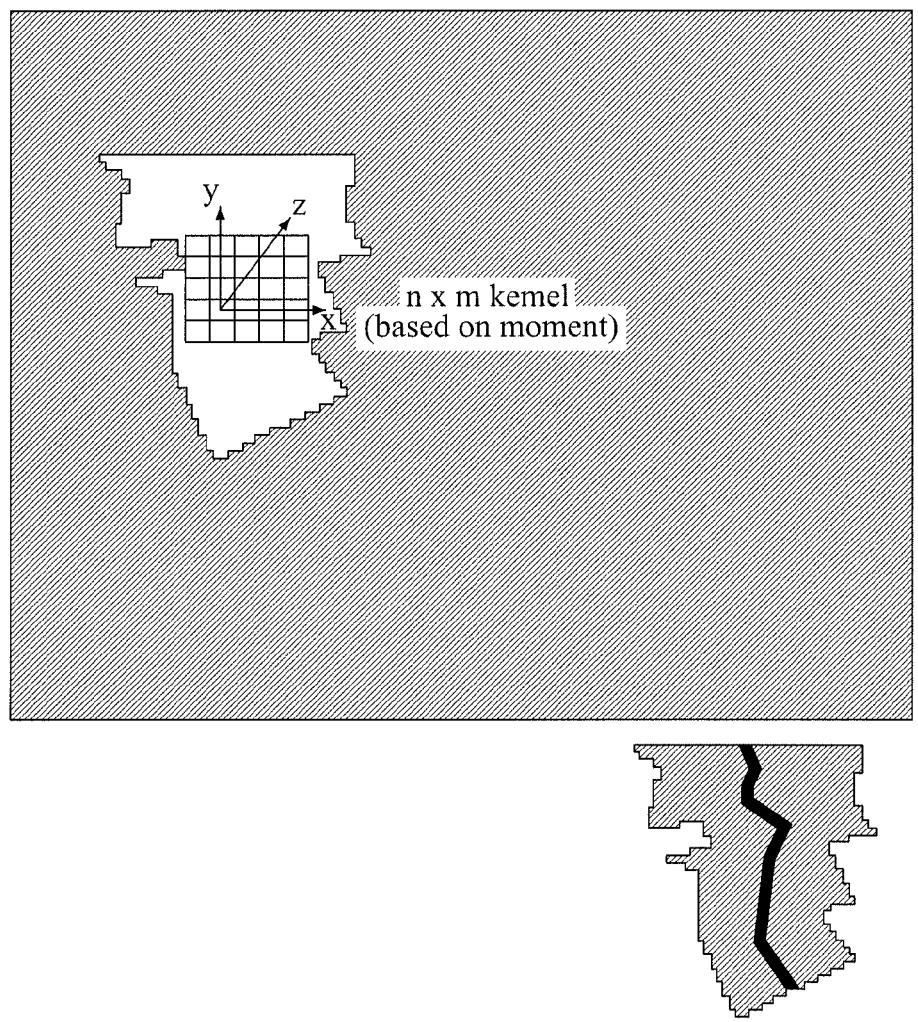
FIG. 19 is a diagram illustrating an example of a segmented suspension image outputted from a shape noise removal unit.

FIG. 19 is a diagram illustrating an example of a segmented suspension image outputted from a shape noise removal unit 1860.

The x and y estimation unit 1870 may determine moments of the segmented suspension image as (x, y) coordinates of a suspension image.

The z estimation unit 1880 may create a kernel (n×m) with respect to the moments of the segmented suspension image, and calculate an intensity of the kernel using the following Equation 1.

$$IM(x, y) = \frac{\sum_{i=1, j=1}^{n,m} I(i, j)}{n \times m} \quad \text{[Equation 1]}$$

Here, IM(x,y) denotes an intensity of the kernel, and may be an average of all points constituting the kernel. The intensity may increase when a hand of the user is closer to a screen, that is, the interactive display unit 1710. The z estimation unit 1880 may calculate z coordinates of a segment image using the following Equation 2.

$$Z(x,y) = IM \times \alpha + Sc \times (1-\alpha) \quad \text{[Equation 2]}$$

Here, Z(x,y) denotes z coordinates of the segmented suspension image, IM denotes an intensity of the kernel calculated in Equation 1, Sc denotes a size of the segmented suspension image, and α denotes a rate where Sc is applied. The Sc may increase when being closer to the screen. When α=1, the z coordinates may be obtained only using the intensity. α may be adoptively adjusted depending on a system.

The rotation information estimation unit 1890 may calculate rotation information of the suspension, that is, pitch, yaw, and roll, using Equations 3 to 5 as below. The rotation information of the suspension may indicate an orientation and tilt of a hand.

$$rx = \frac{\sum_{i=1,j=1}^{n,m} (I(i,j) - I(i,j-1))}{n \times (m-1)} \text{ (Pitch)} \quad \text{[Equation 3]}$$

$$ry = \frac{\sum_{i=1,j=1}^{n,m} (I(i,j) - I(i-1,j))}{(n-1) \times m} \text{ (Yaw)} \quad \text{[Equation 4]}$$

$$rz = \frac{\sum_{j=1}^{m} (C(j) - C(j-1))}{m-1} \text{ (Roll)} \quad \text{[Equation 5]}$$

Referring to Equation 3 and Equation 4, the rotation information estimation unit 1890 may create a kernel with respect to moments of the segmented suspension image, and calculate the pitch and yaw using an intensity difference between pixels. Also, referring to Equation 5, the rotation information estimation unit 1890 may calculate the roll using center point information of each row in the segmented suspension image.

The center point information of each row may be an intensity average ($C_{(j)}$) of each row.

The suspension image processing unit 1740 may output suspension point information (x, y, z, rx, ry, rz) including position information (x, y, z) and rotation information (rx, ry, rz) of the segmented suspension image, and a suspension count.

Referring again to FIG. 17, the suspension gesture determination unit 1750 may store, in a corresponding queue of multi-queue 1751, point coordinates (x,y,z,rx,ry,rz) of the suspension image estimated in the suspension image processing unit 1740. When the suspension count is 2, coordinates of each point may be stored in mutually different queues (for example, queue 1 and queue 2). Also, the multi-queue 1751 may store the point coordinates in a first in first out (FIFO) scheme.

Figure 20:
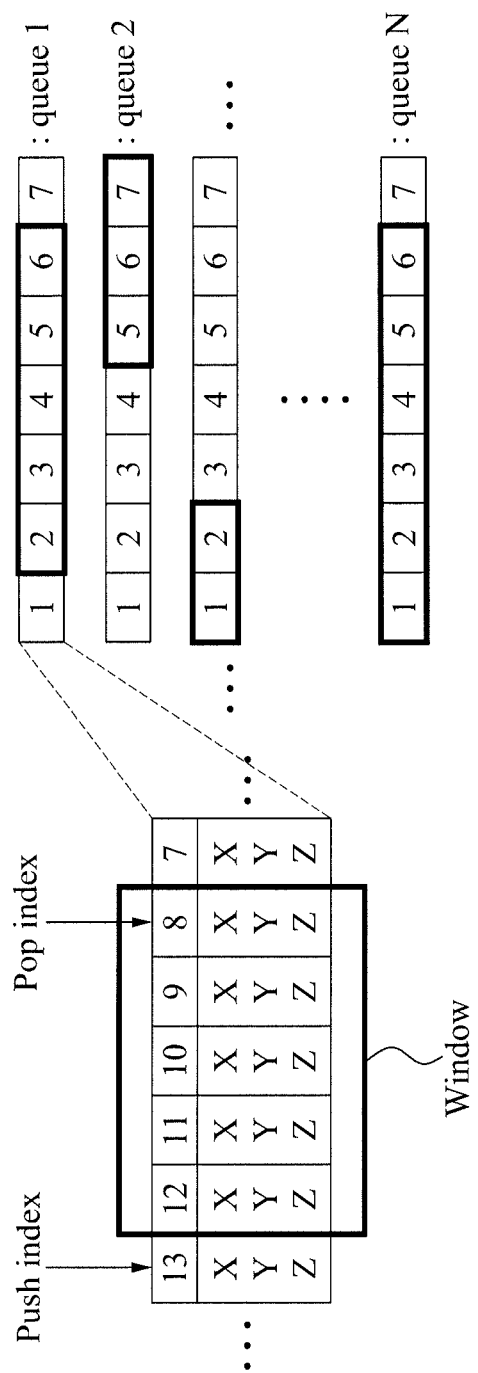
FIG. 20 is a diagram illustrating an example of a multi-queue.

FIG. 20 is a diagram illustrating an example of a multi-queue.

Referring to FIG. 20, the multi-queue 1751 may have N number of queues, each of the N number of queues may correspond to a hand of mutually different users. For example, the point coordinates (x,y,z,rx,ry,rz) of the suspension image calculated in the suspension image processing unit 1740 may be mapped in an index to be stored in a queue 1. A pop index may be an index involving a sliding window, and a push index may be an index that is most recently calculated to be stored in the queue 1. The sliding window may designate indices where outlier filtering is applied.

Also, the suspension gesture determination unit 1750 may determine a gesture type by the suspension based on the point coordinates of the suspension image stored in the multi-queue 1751 and the estimated suspension count. The suspension gesture determination unit 1750 may output an event of the determined suspension gesture type.

Specifically, when at least one hand of the user is moved from a current position to a next position by a suspension, the suspension gesture determination unit 1750 may remove protruded points using a standard deviation of a distance between a plurality of points existing between the current position and the next position.

Figure 21:
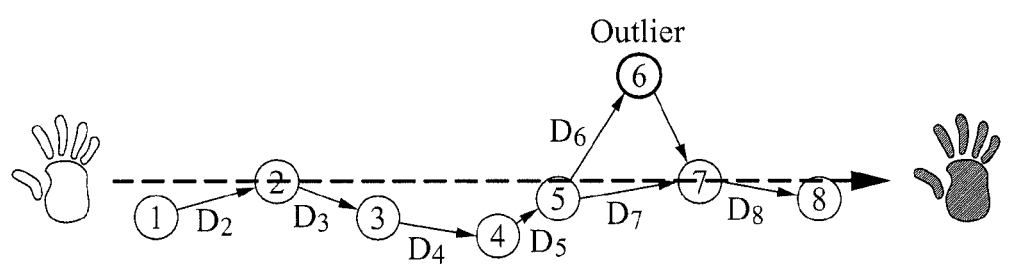
FIG. 21 is a diagram illustrating a hand's movement path by suspension.

FIG. 21 is a diagram illustrating a hand's movement path by suspension.

Referring to FIG. 21, respective points 1 to 6 may correspond to six indices included in the sliding window from among indices stored in a queue corresponding to the suspended hand. In FIG. 21, a movement path of a suspended hand may be deviated in a point 6. The suspension gesture determination unit 1750 may calculate a standard deviation of a distance between points using the following Equation 6.

$$D_m = \frac{\sum_{i=1}^{n} \sqrt{(px_i - px_{i-1})^2 + (py_i - py_{i-1})^2}}{n-1} \quad \text{[Equation 6]}$$

$$D_1 = \sqrt{(px_i - px_{i-1})^2 + (py_i - py_{i-1})^2}$$

$$\sigma = \sqrt{\frac{\sum_{i=1}^{n}(D_i - D_m)^2}{n-1}}$$

Here, σ denotes a standard deviation, n denotes a number of points positioned in the movement path of the hand. The suspension gesture determination unit 1750 may compare distances D1 to D7 between the respective points with the standard deviation, and remove a point (for example, the point 6 of FIG. 21) having a distance greater than the standard deviation. In this manner, an outlier filtering may be performed. Specifically, the suspension gesture determination unit 1750 may perform the outlier filtering using the following Equation 7.

$$(D_m - D_i)^2 < (\sigma \times \omega)^2 \quad \text{[Equation 7]}$$

Here, the suspension gesture determination unit 1750 may substitute, in Equation 7, $D_m$, $D_i$, and σ calculated in Equation 6, and determine whether an i-th point (that is, i-th index) is protruded. When the compared result of Equation 7 is yes, the suspension gesture determination unit 1750 may determine that the i-th point is not protruded.

Conversely, when the compared result of Equation 7 is no, the suspension gesture determination unit 1750 may determine that the i-th point is protruded, and determine $dx_i=0$, $dy_i=0$, and $dz_i=0$.

When the outlier filtering is performed, the suspension gesture determination unit 1750 may calculate an average of distances between the plurality of points in an x-axis direction, a y-axis direction, and a z-axis direction, respectively.

The suspension gesture determination unit 1750 may compare two calculated averages, and recognize a suspension direction of a 2D slap gesture. The suspension gesture determination unit 1750 may calculate the averages of distances between points using the following Equation 8.

$$dx_m = \frac{\sum_{i=1}^{n}(px_i - px_{i-1})}{n-1}$$

$$dy_m = \frac{\sum_{i=1}^{n}(py_i - py_{i-1})}{n-1}$$

$$dz_m = \frac{\sum_{i=1}^{n}(pz_i - pz_{i-1})}{n-1}$$

[Equation 8]

Here, $dx_m$, $dy_m$, and $dz_m$ denotes an average of distances between points, and also denotes a partial gradient mean. The suspension gesture determination unit 1750 may determine a suspension gesture type based on presence/absence of the recognized suspension direction, a suspension count, and information regarding whether a touch is performed.

The suspension gesture determination unit 1750 may generate an event of the determined suspension gesture type to output the generated event to the UI processing unit 1760.

Referring again to FIG. 17, the UI processing unit 1760 includes a touch UI processing unit 1761 and a suspension UI processing unit 1763. The UI processing unit 1760 may perform the above described operations with reference to FIGS. 12 to 16.

For example, when a multi-touch event is inputted from the multi-touch driver 1730, the touch UI processing unit 1761 may zoom in on a displayed UI. The zoom-in UI may be displayed in the interactive display unit 1710.

The suspension UI processing unit 1763 may verify the suspension gesture type based on the event inputted from the suspension gesture determination unit 1750.

The suspension UI processing unit 1763 may move a position of a virtual object of the displayed UI or a background, or change a viewpoint of a camera. The UI where the position of the virtual object or the viewpoint of the camera is changed may be displayed in the interactive display unit 1710.

Figure 22:
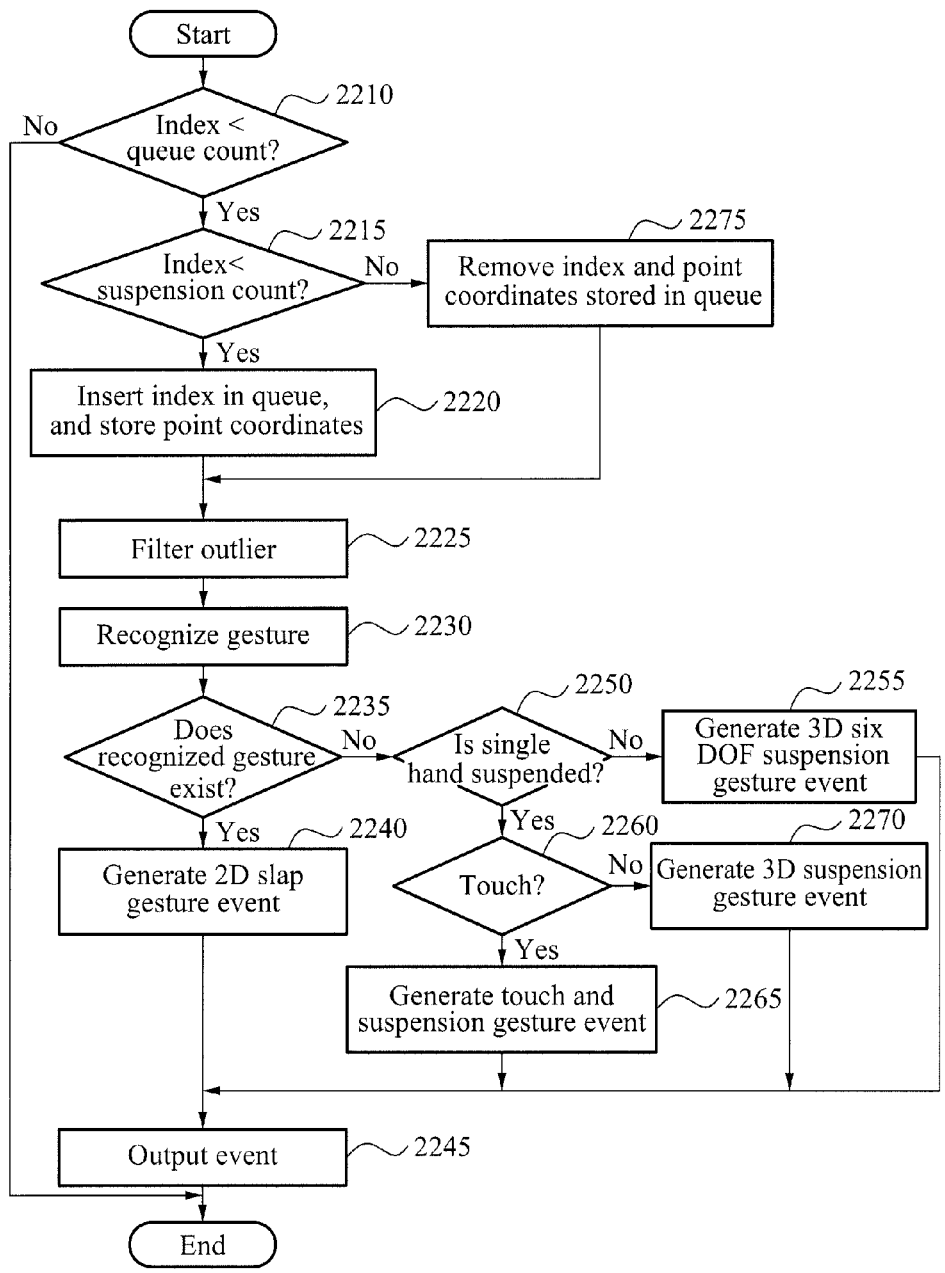
FIG. 22 is a flowchart illustrating a process where a gesture type is determined using a suspension point and a suspension count stored in a multi-queue.

FIG. 22 is a flowchart illustrating a process where a gesture type is determined using a suspension point and a suspension count stored in a multi-queue.

In operation 2210, a suspension gesture determination unit may compare a number of indices and a number of queues stored in a multi-queue.

In operation 2215, when the number of indices is smaller than the number of queues, the number of indices and a suspension count may be compared.

In operation 2220, when the number of indices is smaller than the suspension count, the suspension gesture determination unit may insert a push index in a corresponding queue of the multi-queue, and store suspension point coordinates (x,y,z,rx,ry,rz) corresponding to the index.

In operation 2225, the suspension gesture determination unit may perform an outlier filtering using Equation 6. The suspension gesture determination unit may remove protruded points from the movement path of the hand by the suspension.

In operation 2230, the suspension gesture determination unit may calculate an average of distances between points positioned on the movement path of the hand, using Equation 7, and recognize a direction of the gesture using the calculated result. Specifically, in operation 2230, a direction of the 2D slap gesture and presence/absence of the gesture may be recognized.

In operation 2240, when the recognized gesture is present in operation 2235, the suspension gesture determination unit may generate an event indicating the 2D slap gesture.

In operation 2245, the suspension gesture determination unit may output the generated event to the UI processing unit.

In operation 2250, when the recognized gesture is absent in operation 2235, the suspension gesture determination unit may determine whether a single hand is suspended. Specifically, in operation 2250, when the suspension count calculated in the suspension image processing unit is 1, the suspension gesture determination unit may determine that the single hand is suspended, and when the suspension count is 2, the suspension gesture determination unit may determine that two hands are suspended.

When the two hands are suspended based on the determined result of operation 2250, the suspension gesture determination unit may determine the suspension gesture type as a 3D six degree of freedom (DOF) suspension gesture, and generate an event.

In operation 2260, when the single hand is suspended based on the determined result of operation 2250, the suspension gesture determination unit may verify whether a touch is generated in the interactive display unit.

In operation 2265, when the touch is generated, the suspension gesture determination unit may determine a gesture type of the suspension as a touch and suspension gesture, and generate an event.

In operation 2270, when the touch is not generated, the suspension gesture determination unit may determine the gesture type of the suspension as a 3D suspension gesture, and generate an event.

Conversely, in operation 2215, when the number of indices is greater than the suspension count, the suspension gesture determination unit may remove the pop index and the coordinates which are stored in the queue.

Figure 23:
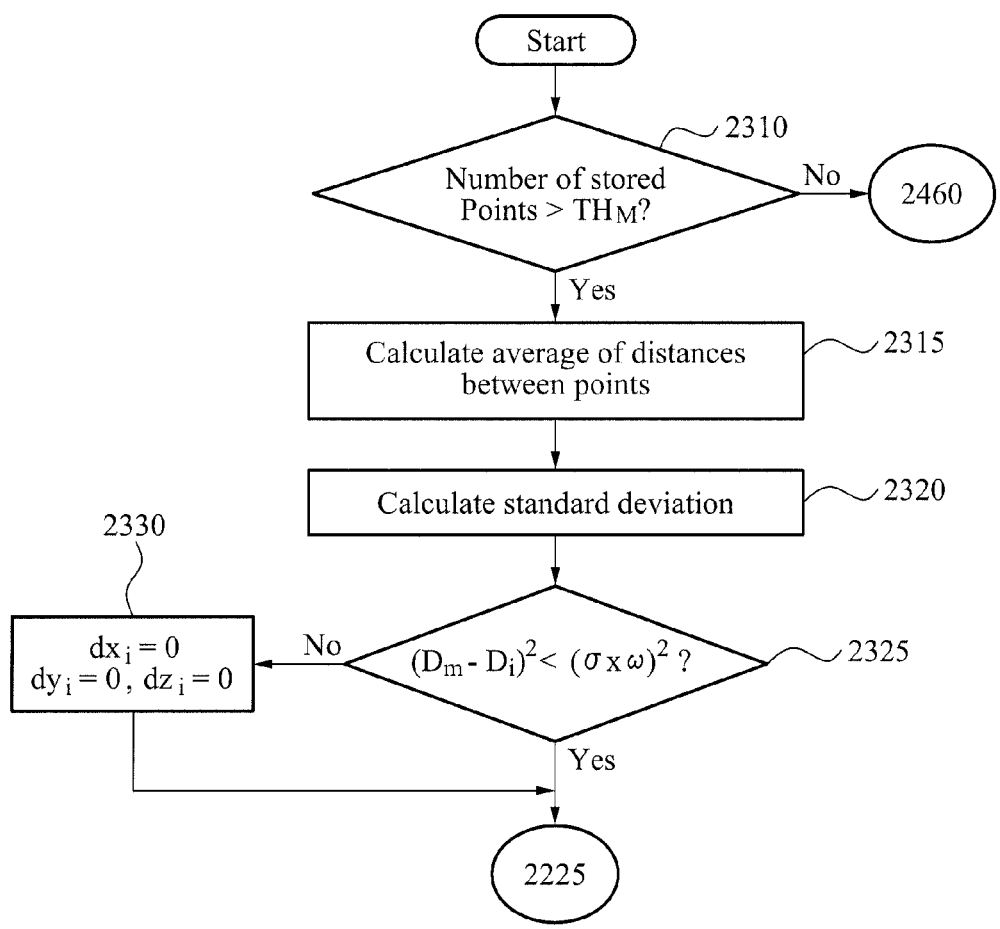
FIG. 23 is a flowchart illustrating a process where a suspension gesture determination unit performs an outlier filtering.

FIG. 23 is a flowchart illustrating a process where a suspension gesture determination unit performs an outlier filtering. In FIG. 23, operation 2225 of FIG. 22 will be described in detail.

In operation 2310, the suspension gesture determination unit may determine whether a number of points (for example, indices 8 to 12 of FIG. 20) included in a window of a queue corresponding to a suspended hand is greater than a reference value $TH_M$.

In operation 2315, when a number of stored points is greater than the reference value $TH_M$, the suspension gesture determination unit may calculate an average ($D_m$) of distances between points and a distance ($D_i$) between points.

In operation 2320, the suspension gesture determination unit may calculate a standard deviation of distances between the points using Equation 6.

In operation 2325, the suspension gesture determination unit may determine whether an i-th point is protruded using Equation 7.

In operation 2330, when $(D_m - D_i)^2$ is greater than $(\sigma \times \psi)^2$, the suspension gesture determination unit may determine that the i-th point is protruded, and remove the i-th point. Specifically, the suspension gesture determination unit may determine $dx_i = 0$, $dy_i = 0$, and $dz_i = 0$.

Conversely, when $(D_m - D_i)^2$ is smaller than $(\sigma \times \omega)^2$, the suspension gesture determination unit may determine that the i-th point is not protruded, and advance operation 2230.

Figure 24:
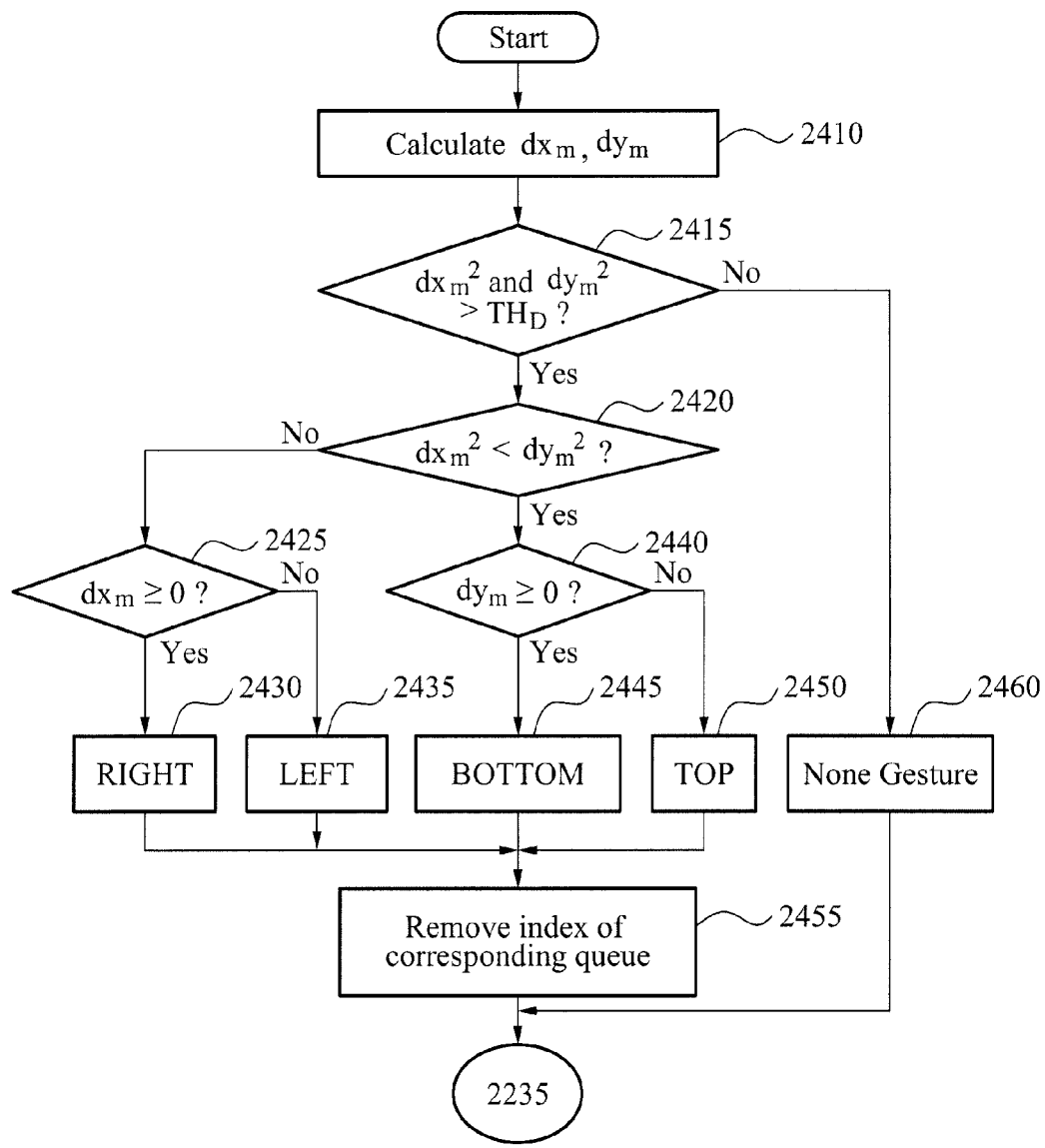
FIG. 24 is a flowchart illustrating a process where a suspension gesture determination unit recognizes a 2D slap gesture.
Figure 25:
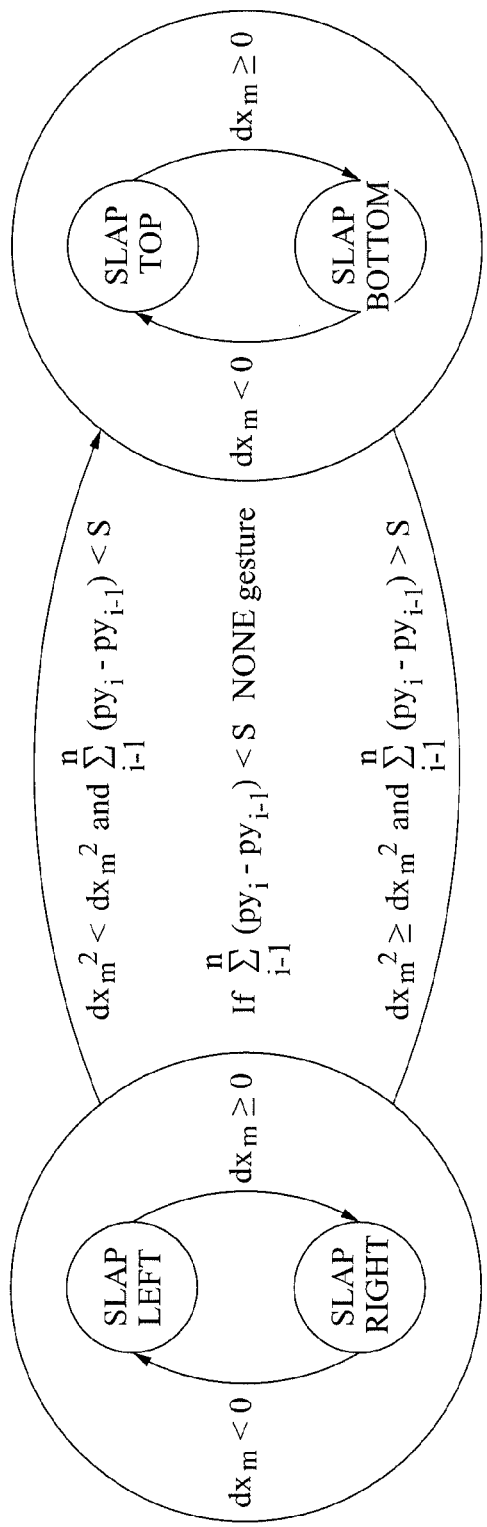
FIG. 25 is a mimetic diagram illustrating a process where a direction of the 2D slap gesture of FIG. 24 is recognized.

FIG. 24 is a flowchart illustrating a process where a suspension gesture determination unit recognizes a 2D slap gesture. In FIG. 24, operation 2230 of FIG. 22 will be described in detail. FIG. 25 is a mimetic diagram illustrating a process where a direction of the 2D slap gesture of FIG. 24 is recognized.

In operation 2410, the suspension gesture determination unit may calculate averages $dx_m$, $dy_m$, and $dz_m$ of distances between points using Equation 8.

In operation 2420, when both of $dx_m^2$ and $dy_m^2$ are greater than a reference value $TH_D$, the suspension gesture determination unit may compare $dx_m^2$ and $dy_m^2$.

In operation 2425, when $dy_m^2$ is smaller than $dx_m^2$, the suspension gesture determination unit may determine whether $dx_m$ is greater than 0.

In operation 2430, when $dx_m$ is greater than or equal to 0, the suspension gesture determination unit may determine that a suspension direction of a 2D slap gesture is a right.

Conversely, in operation 2435, when $dx_m$ is smaller than 0, the suspension gesture determination unit may determine that the suspension direction of the 2D slap gesture is a left.

In operation 2440, when $dy_m^2$ is greater than $dx_m^2$ in operation 2420, the suspension gesture determination unit may compare $dy_m$ and 0.

In operation 2445, when $dy_m$ is greater than or equal to 0, the suspension gesture determination unit may determine that the suspension direction of the 2D slap gesture is a bottom.

Also, in operation 2450, when $dy_m$ is smaller than 0, the suspension gesture determination unit may determine that the suspension direction of the 2D slap gesture is a top.

In operation 2455, when a gesture for the i-th index is recognized by operations 2410 to 2450, the suspension gesture determination unit may remove an index or point information corresponding to the recognized gesture from a corresponding queue. This is to prevent an unnecessary gesture from being recognized due to point information corresponding to the gesture having been recognized.

Conversely, in operation 2460, when one of $dx_m^2$ and $dy_m^2$ is smaller than the reference value based on the compared result of operation 2415, the suspension gesture determination unit may determine that a gesture sensed by the suspension sensor is absent.

FIG. 26 is a flowchart illustrating a method where an interactive display apparatus processes a proximity sensing image.

In operation 2610, a suspension sensor of the interactive display unit may sense at least one hand of a user suspended in a 3D space, and output a proximity sensing image. The proximity sensing image may be outputted in a stream type. The suspension sensor may 2D or 3D proximity-sense the at least one hand.

In operation 2620, the suspension image processing unit may extract a segment image corresponding to the at least one hand by removing noise of the proximity sensing image. The extracted segment image may be the suspended image illustrated in FIG. 19.

In operation 2630, the suspension image processing unit may estimate portion information and rotation information of the segment image, and a suspension count, with respect to a center point of the extracted segment image. The center point of the segment image may be moments of the suspended image illustrated in FIG. 19.

In operation 2640, the suspension gesture determination unit may store, in a multi-queue for recognizing gestures of a plurality of users, the position information and rotation information of the segment image estimated in operation 2630. Specifically, the suspension gesture determination unit may store, in a queue corresponding to a hand performing the suspension from the multi-queue, the position information and rotation information of the segment image.

In operation 2650, since the at least one hand is moved from a current position to the next position in operation 2610, the suspension gesture determination unit may perform an outlier filtering. Specifically, the suspension gesture determination unit may remove protruded points using a standard deviation of distances between a plurality of points existing on a movement path of the suspension.

In operation 2660, the suspension gesture determination unit may calculate an average of distances between the plurality of points in an x-axis and y-axis directions. The calculated average of the respective distances may be $dx_m$ and $dy_m$.

In operation 2670, the suspension gesture determination unit may compare the two averages calculated in operation 2660, and recognize a suspension direction of the 2D slap gesture. Specifically, in operation 2670, whether the suspension performed in operation 2610 is the 2D slap gesture may be determined, and then when the suspension performed in operation 2610 is the 2D slap gesture, the suspension direction may be recognized.

In operation 2680, when the suspension direction recognized in operation 2670 is absent, the suspension gesture determination unit may determine a suspension gesture type structured in a six DOF, using information regarding whether a touch on the UI displayed on the interactive display unit is performed, and also using a suspension count having been calculated.

In operation 2690, the UI processing unit may change at least one of a position or a direction of the UI displayed on the interactive display unit, based on the determined suspension gesture type.

The methods according to the above-described embodiments may be recorded in computer-readable non-transitory storage media including program instructions to implement various operations embodied by a computer. The media may also include, alone or in combination with the program instructions, data files, data structures, and the like. Examples of computer-readable non-transitory media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. The methods according to the above-described embodiments may be executed on a general purpose computer or processor or may be executed on a particular machine such as any of the apparatuses or devices described herein.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method for proximity-sensing in an interactive display, the method comprising:

sensing coordinates (x1, y1) of a position touched by a hand of a user, while the other hand of the user is suspended;

sensing coordinates (x2, y2, z2) of a position where the other hand is suspended, while the position is touched by the hand of the user;

sensing a rotation direction (rx, ry, rz) by a suspension of the other hand, while the position is touched by the hand of the user;

determining a virtual object to be manipulated in a UI displayed on a screen, based on the coordinates (x1, y1);

calculating a movement speed and a movement acceleration speed of the other hand, based on the coordinates (x2, y2, z2);

calculating a movement speed of the virtual object, based on the movement speed and the movement acceleration speed;

calculating a rotation speed and a rotation acceleration speed of the other hand using the rotation direction (rx, ry, rz);

calculating a rotation speed of the virtual object based on the rotation speed and the rotation acceleration speed;

applying the movement speed of the virtual object to create a movement effect of the virtual object; and applying the rotation speed of the virtual object to create a rotation effect of the virtual object.

2. The method of claim 1, wherein the suspension comprises a two dimensional (2D) slap gesture to suspend the other hand of the user in a desired direction of a vertical direction and a horizontal direction to change the virtual object in the desired direction of the vertical direction and the horizontal direction.

3. The method of claim 1, wherein the virtual object is a surface of a hexahedron User Interface (UI), and is transformed to another surface of the hexahedron UI in a suspension direction.

4. The method of claim 1, wherein the suspension comprises a 3D suspension gesture of moving the other hand of the user from a position in a 3D space to another position in a 3D space or to rotate the other hand of the user in the 3D position to thereby change the at least one of the position of the virtual object and the viewpoint of the user.

5. The method of claim 4, wherein the 3D suspension gesture comprises a 3D movement gesture to move the virtual object from the other 3D position to a corresponding position.

6. The method of claim 4, wherein, when the virtual object is a 3D passage, the 3D suspension gesture includes a forward movement gesture of moving the other hand of the user towards the screen and a backward movement gesture to move the other hand of the user away from the screen.

7. The method of claim 1, wherein the suspension comprises a 3D six degrees of freedom (DOF) suspension gesture of moving the other hand of the user from a current position in a 3D space to another position in the 3D position, and to rotate the other hand of the user.

8. A non-transitory computer-readable medium storing instructions that, when executed by a computer, cause the computer to perform the method of claim 1.

9. The method of claim 1, further comprising:

calculating a scene change speed of the UI based on the movement speed and the movement acceleration speed; and applying the scene change speed to a special effect for scene change.

10. The method of claim 9, wherein the special effect comprises a motion blur effect for scene change.

11. A proximity-sensing apparatus used with an interactive display, the proximity-sensing apparatus comprising:

a suspension sensor configured to:

sense coordinates (x1, y1) of a position touched by a hand of a user, while the other hand of the user is suspended, sense coordinates (x2, y2, z2) of a position where the other hand is suspended, while the position is touched by the hand of the user, and sense a rotation direction (rx, ry, rz) by a suspension of the other hand, while the position is touched by the hand of the user;

a suspension image processing unit configured to:

determine a virtual object to be manipulated in a UI displayed on a screen, based on the coordinates (x1, y1), calculate a movement speed and a movement acceleration speed of the other hand, based on the coordinates (x2, y2, z2), calculate a movement speed of the virtual object, based on the movement speed and the movement acceleration speed, calculate a rotation speed and a rotation acceleration speed of the other hand using the rotation direction (rx, ry, rz), and calculate a rotation speed of the virtual object based on the rotation speed and the rotation acceleration speed; and a user interface processing unit configured to:

apply the movement speed of the virtual object to create a movement effect of the virtual object, and apply the rotation speed of the virtual object to create a rotation effect of the virtual object.

* * * * *